455/3

United States Patent [19]

Moses

[11] 3,751,595

[45] Aug. 7, 1973

[54] TIME SHARING SUBSCRIBER COMMUNICATIONS SYSTEM

[75] Inventor: Donald W. Moses, Troy Township St. Croix County, Wis.

[73] Assignee: Minnesota Mining and Manufacturing Company.

[22] Filed: Mar. 6, 1972

[21] Appl. No.: 232,096

Related U.S. Application Data

[63] Continuation-in-part of Ser. No. 17,367, March 9, 1970, Pat. No. 3,647,976.

[52] U.S. Cl..... 179/15 AL, 179/15 BY, 179/16 EC, 179/84 VF, 329/50, 329/122

[51] Int. Cl............................ H04j 3/08, H04j 3/12

[58] Field of Search...................... 179/15 R, 15 FD, 179/15 AL, 15 BY, 16 EC, 84 VF, 15 BP; 329/50, 122, 123; 328/133, 134

[56] References Cited

UNITED STATES PATENTS

| | | | |
|---|---|---|---|
| 3,626,311 | 12/1971 | Kraybill | 329/50 |
| 3,436,487 | 4/1969 | Blane | 179/84 VF |
| 3,060,269 | 10/1962 | Stack | 179/15 BY |
| 3,411,092 | 11/1968 | Ronne | 329/50 |
| 3,525,945 | 8/1970 | Puente | 329/50 |

*Primary Examiner*—Kathleen H. Claffy
*Assistant Examiner*—David L. Stewart
*Attorney*—Alexander et al.

[57] ABSTRACT

A time sharing subscriber communications system wherein a time-division multiplexed signal having a series of frames and a predetermined number of time slots in each frame, is carried from a transmitter terminal over a single communications circuit containing a plurality of series connected subscriber terminals. At the transmitter terminal, information corresponding to input signals received from various input channels is placed in the time slots in the series order of the subscriber terminals. At each of the subscriber terminals the information contained in a set of one or more time slots of each frame related to that subscriber terminal is tapped-off and the other information is retransmitted over the circuit along with new information provided at the subscriber terminal in the last set of time slots. Thus, the information for the succeeding subscriber terminal occupies the first set of time slots in each frame of the retransmitted signal, and all of the subscriber terminals may be of identical construction in respect to identifying within each frame, the set of time slots related thereto.

In a communications system wherein a pulsed signal, containing audio information derived from an audio input signal within a first frequency range, and supervisory information derived from a supervisory input signal at a second frequency outside the first frequency range is demodulated to provide a composite signal containing both the audio information within the first frequency range and the supervisory information at the second frequency, a synchronous detector is used to produce an output signal corresponding to the supervisory information whenever the composite signal contains second frequency components in synchronism with the pulsed signal.

5 Claims, 40 Drawing Figures

PATENTED AUG 7 1973

3,751,595

SHEET 07 OF 20

TIME SHARING SUBSCRIBER COMMUNICATIONS SYSTEM

CROSS REFERENCE TO RELATED APPLICATION

This application is a continuation-in-part of my copending application, entitled "Time Sharing Subscriber Communications System", Ser. No. 17,367, filed Mar. 9, 1970 to be issued as U. S. Pat. No. 3,647,976 on Mar. 7, 1972.

BACKGROUND OF THE INVENTION

1. Field of the Invention

The present invention generally pertains to pulsed signal communications systems. In one aspect the present invention is directed to a system wherein a time-division multiplexed signal containing information related to a plurality of subscriber terminals is carried over a communications circuit connected to the subscriber terminals.

In another aspect the present invention is directed to the detection of a single type of information from a pulsed signal carrying two types of information.

2. Description of the Prior Art

Known time sharing subscriber communications systems carry a time-division multiplexed signal from a transmitter terminal over a single communications circuit containing a plurality of series connected subscriber terminals. The timedivision multiplexed signal has a series of frames and a predetermined number of time slots in each frame. Such systems are described in U. S. Pat. No. 3,529,089 3,519,750 and 3,483,329. In accordance with the teaching of said U.S. Pat. No. 3,483,329, information corresponding to input signals received at the transmitter terminal from various input channels is placed in the time slots, in the series order of the subscriber terminals. At each of the subscriber terminals the information contained in a set of one or more time slots related to that subscriber terminal is tapped-off and the other information is retransmitted over the circuit along with new information provided at the subscriber terminal. Each frame of the time-division multiplexed signal transmitted from the subscriber terminal contains the same number of time slots as is contained in the signal received at the subscriber terminal.

In the various prior art systems, each time slot is of a sufficiently long duration to include whatever information is communicated from a single input channel during each single time frame, and may include one or several pulses depending upon the particular type of modulation scheme which is employed. For example, a grouped plurality of binary digits is contained in a single time slot of a pulse code modulation (PCM) carrier system, such as is used in the system described in said U.S. Pat. Nos. 3,483,329 and 3,519,750. Other modulation schemes which may be used in time sharing subscriber communications systems include delta modulation as is used in the system described in U.S. Pat. No. 3,529,089, pulse amplitude modulation (PAM), pulse position modulation (PPM) and pulse width or duration modulation (PWM or PDM).

A problem which is common to these prior art systems is that each subscriber terminal must be of unique construction in order to enable identification within the time-division multiplex signal frame, of the particular set of time slots which is related to that subscriber terminal. The related set of time slots is identified either by the inclusion at each subscriber terminal of means for counting the number of time slots in each frame until the set of time slots related to that subscriber terminal is received, or by including means at each subscriber terminal for recognizing a particular address code which is included in that set of time slots of each frame that is related to that subscriber terminal. When the address code is included in the set of time slots, less of other types of information can be concentrated within a given duration of time.

Concerning the prior art related to the other aspect of the present invention as noted above under the heading "Field of the Invention", in communications systems utilized for providing telephone services, audio information and supervisory information are superimposed during modulation and are both contained in pulsed signals carried over the telephone circuit. The audio information is derived from an audio input signal within a first frequency range. The supervisory information is derived from a supervisory input signal at a second frequency outside the first frequency range. The pulsed signal is demodulated to provide a composite signal containing both the audio information within the first frequency range and the supervisory information at the second frequency. Finally, the composite output signal is treated to provide separate signals respectively corresponding to the audio information and the supervisory information.

Such separate signals have been so provided by one scheme whereby band pass filters are used to separate the audio and supervisory information signals. In order to filter out the supervisory information signal, which generally is transmitted at a single frequency, the filters must be quite accurate with extremely close tolerances and are therefore quite complex and expensive.

According to another scheme, the audio information is included in one group of pulse locations within the pulsed signal and the supervisory information is included in a separate pulse location within the pulsed signal. Separation of the audio and supervisory information is achieved during demodulation by reading the separate pulse locations within the pulsed signal. However, when this scheme is used, less audio information can be concentrated within a given duration of time.

SUMMARY OF THE INVENTION

The present invention provides an improvement to a time sharing subscriber communications system of the type described whereby all of the subscriber terminals need not be uniquely constructed in order to enable identification within each frame of the set of time slots which is related to that subscriber terminal. This is accomplished by providing that the transmitting means of each subscriber terminal comprise a circuit for inhibiting retransmission of the first set of one or more time slots in each frame which are received at that subscriber terminal, for enabling retransmission of the remaining portion of the received signal, and for enabling subsequent transmission of the new information provided at the subscriber terminal as the last set of time slots.

As a result, the information for the succeeding subscriber terminal occupies the first set of time slots in each frame of the retransmitted signal. Therefore, all of the subscriber terminals may be of identical construction with respect to identifying within each frame the set of time slots related thereto. Economies in design and construction are thereby provided and maximum information can be concentrated within a time slot of a given duration.

Referring to that aspect of the present invention, which is directed to the detection of a single type of information from a pulsed signal carrying two types of information, there is provided an improved means for producing an output signal corresponding to the second type of information contained within the composite signal provided upon demodulation of the pulsed signal. According to the present invention, a synchronous detector circuit is used to produce an output signal corresponding to the second type of information, such as supervisory information in a telephone signal, whenever the composite signal contains second frequency components in synchronism with the pulsed signal. In a preferred embodiment, the synchronous detector circuit comprises a first circuit for detecting the pulsed signal and for generating a first signal at the second frequency and in synchronization with the pulsed signal; a second circuit for mixing the composite signal and the first signal for producing a second signal which will contain a DC component whenever said composite signal contains the second type of information at the second frequency; and a third circuit for detecting the DC component in the second signal, and for producing an output signal in response thereto. Through the use of a synchronous detector, a supervisory signal may be detected in a more reliable, more sensitive and more selective, but yet less complex and less expensive manner; and maximum audio information can be concentrated within a time slot of a given duration. This aspect of the present invention is incorporated in a preferred embodiment of the time sharing subscriber communications system described herein.

DESCRIPTION OF THE PREFERRED EMBODIMENT

One preferred embodiment of the subscriber communications system of the present invention is fully described in my above cross-referenced copending application, which description is incorporated by reference herein. A description of another preferred embodiment of the present invention including all aspects thereof, follows.

The time sharing subscriber communications system of the present invention may be used to simultaneously provide telephone service to a plurality of time sharing subscribers along its route.

Figure 1:
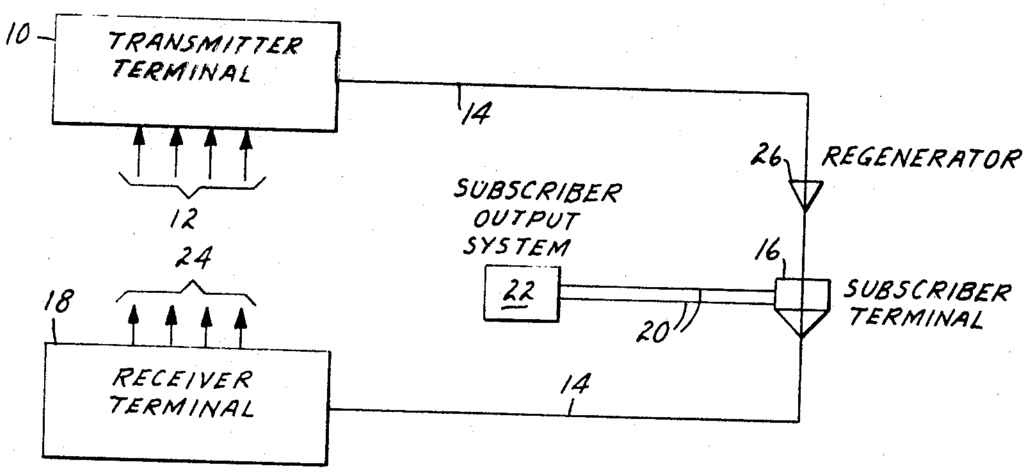
FIG. 1 is a simplified block diagram illustrating the concept of a time sharing subscriber communications system.

Referring first to FIG. 1, the transmitter terminal 10 converts the signals received on a first given number of input channels 12 into a time-division multiplexed signal and transmits the time-division multiplexed signal over a single wideband circuit 14, such as a coaxial cable 14. This signal is received at the subscriber terminal 16 which is one of a plurality of subscriber terminals 16 connected in series along tthe wideband circuit 14 between the transmitter terminal 10 and the receiver terminal 18.

At each subscriber terminal 16, the information contained in the time-division multiplexed signal which relates to that subscriber terminal 16, is tapped-off and provided on the lines 20 to the subscriber output system 22. The subscriber output system 22 may provide service for one or more subscribers and may include a telephone set, a computer, a similar type of output device or a plurality or a combination thereof.

Information provided from the subscriber output system 22 is furnished on the lines 20 to the subscriber terminal 16. In accordance with this aspect of the present invention, the subscriber terminal 16 first retransmits that portion of the signal received on the wideband circuit 14 which is not intended for that subscriber terminal 16, and then transmits new information provided on the lines 20 from the subscriber output device 22. A detailed explanation of this aspect of the present invention is provided below in connection with the discussion related to FIGS. 10 and 11A through 11E. First, however, further information essential to an understanding of the entire system is provided.

Again referring to FIG. 1, the time-division multiplexed signal transmitted from the subscriber terminal 16 is transmitted to the next subscriber terminal on the circuit 14 where the tapping-off and retransmitting and transmitting processes are repeated. Eventually, the time-division multiplexed signal which is received at the receiver terminal 18 contains only information transmitted from the various subscriber terminals 16. At the receiver terminal 18, the information contained in the time-division multiplexed signal is received, tapped-off, demodulated, and provided to a second given number of output channels 24, which are related to the subscriber terminals 16 on the wideband circuit 14.

Pulse regenerators 26 are also connected in series in the wideband circuit 14 as required, when the distance between terminals 10, 16, 18 is sufficiently great that the time-division multiplexed signal transmitted from the previous terminal 10, 16 on the circuit 14 would otherwise be materially degraded.

The connection from the subscriber terminal 16 to a subscriber output system 22, such as a telephone set, is equivalent to the connection between the line tap unit and the telephone set in the station carrier system described in the technical manual "S6 Station Carrier Description and Application Manual", which is available from Anaconda Electronics Company, 1430 S. Anaheim Blvd., Anaheim, Calif. 92803.

Figure 2:
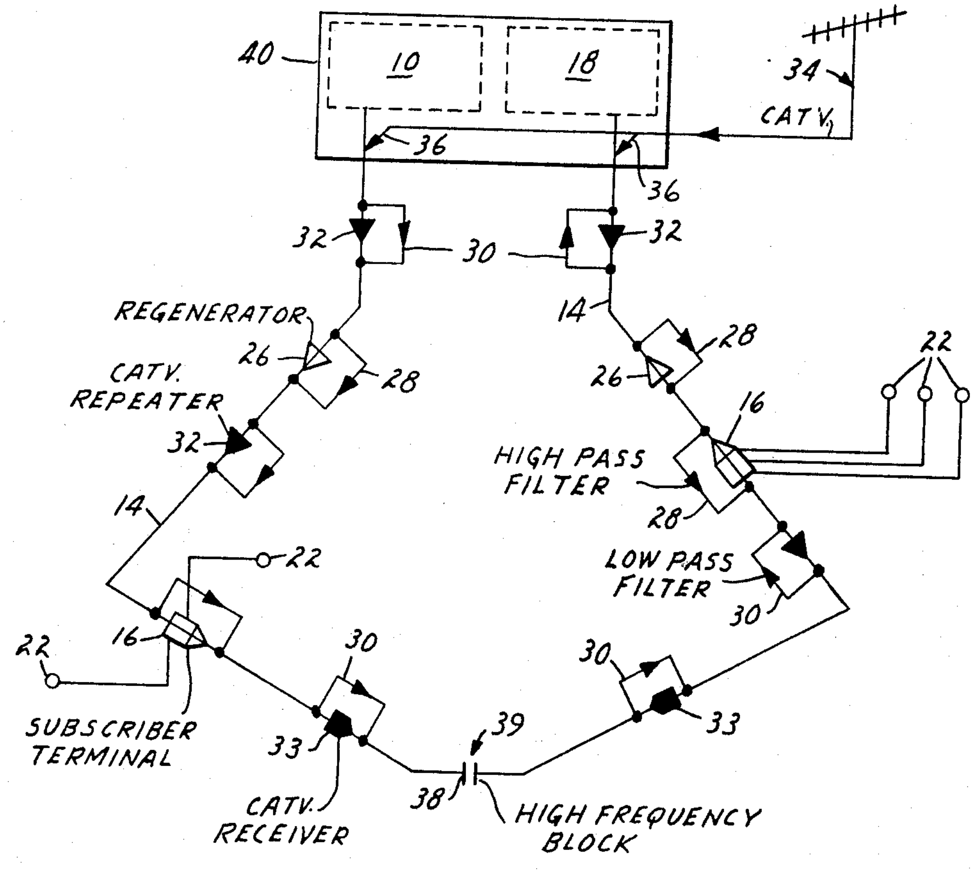
FIG. 2 is a simplified block diagram illustrating a "closed loop" time sharing subscriber communications system in accordance with the present invention, wherein telephone services and cable TV services are provided over the same physical circuit.

The system of the present invention may be a closed loop system as illustrated by FIG. 2, wherein both the transmitter terminal 10 and the receiver terminal 18 are located at and interfaced with the wideband circuit at the central exchange office 40. Alternatively, the system of the present invention may be a non-closed loop system as illustrated in FIG. 3, wherein the receiver terminal 18 is located at and interfaced with the wideband circuit at the central exchange office 40; and the transmitter terminal 10, although also located at the central exchange office 40, is interfaced through a frequency multiplex system to the wideband circuit at a remote location 52.

Referring to the closed loop system of FIG. 2, telephone service is provided in a relatively low frequency band over the same wideband circuit 14 which is used for transmitting other services, such as cable TV (CATV). A single low frequency band, such as from 1 to 50 megahertz, is reserved for the telephone service so as not to interfere with or to be interfered with by the other transmitted services. High-pass filters 28 are coupled around the telephone service pulse regenerators 26 and subscriber terminals 16; and low-pass filters 30 are coupled around the CATV repeaters 32 and CATV receivers 33 in order to prevent degradation of either type of service by reason of the connection to the circuit 14 of equipment necessary for providing the other type of service. It is noted that while the telephone services are provided in only one direction from the transmitter terminal 10 around the circuit 14 to the receiver terminal 18, the CATV services from the CATV headend 34 are transmitted over the circuit 14 by coupling onto the circuit 14 through directional couplers 36 which are connected to the circuit 14 at both the transmitter terminal end and the receiver terminal end of the circuit 14. A high frequency block 38 is provided in the circuit at a location 39 remote from the central exchange office 40 to prevent the CATV service from interfering with itself. The high frequency block 38 passes the lower frequencies used for the telephone services so that the telephone services may nevertheless be transmitted through this remote location 39.

Figure 3A:
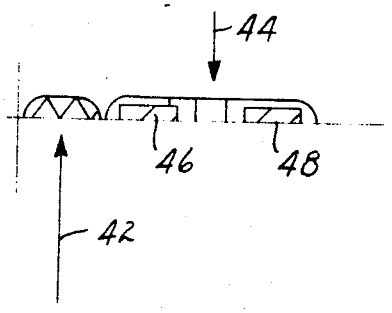
FIG. 3A is a graphical representation of the frequency allocation characteristics of the "non-closed loop" time sharing subscriber communications system of FIG. 3.
Figure 3:
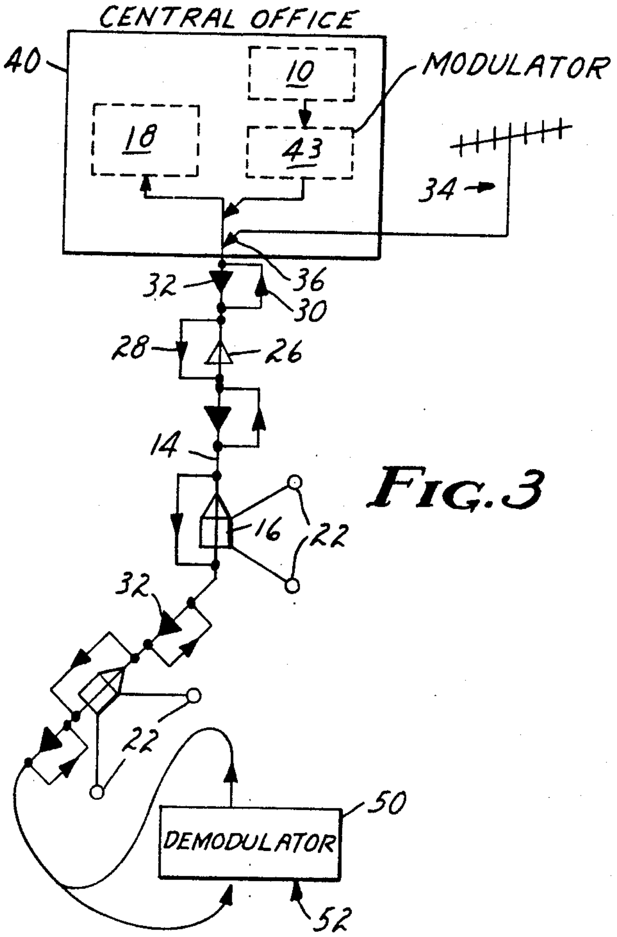
FIG. 3 is a simplified block diagram illustrating a "non-closed loop" time sharing subscriber communications system in accordance with the present invention, wherein telephone services and cable TV services are provided over the same physical circuit.

Referring to the non-closed loop system of FIG. 3, wherein telephone services and CATV are again provided over the same wideband circuit 14, a time-division multiplexed signal for providing telephone services is transmitted over the wideband circuit 14 in a low frequency band 42 (FIG. 3A) to the subscriber terminals 16 and eventually to the receiver terminal 18 at the central exchange office 40. First, however, the time-division multiplexed signal transmitted from the transmitter terminal 10, which is located at the central exchange office 40, is frequency translated by a modulator 43 and then carried over the wideband circuit 14 by a frequency multiplexed system in a high frequency band 44, such as from 108 to 174 megahertz, which is between two TV channels 46 and 48, such as TV channels 6 and 7, from the modulator 43 at the central exchange office 40 location to a demodulator 50 at a remote location 52, from whence it is provided over the low frequency band 42 to the subscriber terminals 16, and thence to the receiver terminal 18 at the central exchange office 40. The high frequency band 44, which carries the transmitted time-division multiplexed signal to the remote location 52, is amplified by each CATV repeater 32 so as to prevent degradation between the modulator 43 and the demodulator 50.

In the time sharing scheme of the present invention, time sharing is accomplished by sampling each input channel, such as a telephone channel, at a minimum rate such as 10,000 times per second. If there are a given number of telephone channels on the system, such as 999, there will be that given number (999) of signal amplitude levels which must be sampled in accordance with the minimum rate (in this case, each is sampled every 1/10,000th of a second).

The preferred modulation scheme is a zero-axis crossing modulation scheme which is a modification and improvement of the pulse width modulation scheme. This modulation scheme is the subject of my above cross-referenced copending application. In the zero-axis crossing modulation scheme, the information is carried by a pulse train signal, the level of which is instantaneously switched between a nominal positive voltage and a nominal negative voltage about a nominal zero axis. The elapsed time between such zero-axis crossings defines the analog value of the signal at an input channel source then being sampled. Each time slot is defined by the interval between successive zero-axis crossings and the information contained in each time slot is defined by the duration of the time slot. A frame is defined as each series of information samples wherein each input channel is sampled at once. Within each frame there are a predetermined number of time slots, which number is limited by the band width of the given frequency band on the single wideband circuit 14. The end of a sync pulse signals the beginning of each frame such that the information corresponding to a particular input channel is always a countable number of zero-axis crossings behind the sync pulse. The demodulation of the received time-division multiplexed signal is accomplished by providing an integrated signal of linearly varying amplitude during the duration of the time slot being received.

Figure 4A:
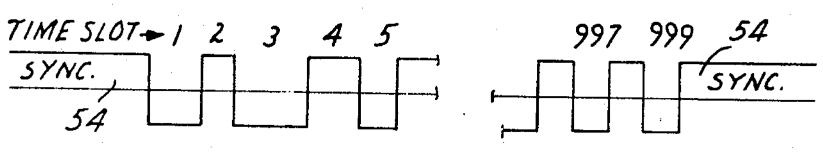
FIGS. 4A, 4B and 4C illustrate the zero axis crossing modulation scheme used with the time sharing subscriber communications system illustrated in FIGS. 1–3.
Figure 4B:
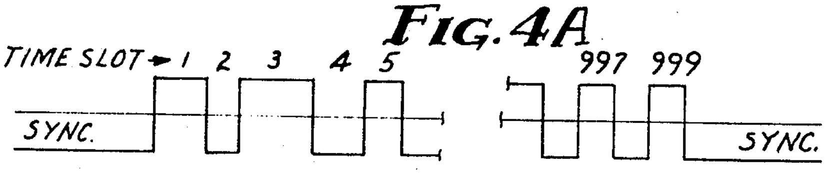
Figure 4C:
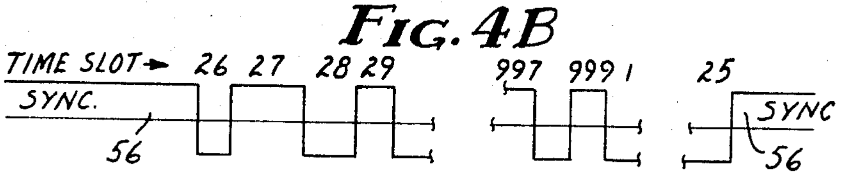

Referring to FIG. 4A, which shows one frame of the signal as received at the first subscriber terminal location 16, the information corresponding to input channel number 1 is tapped-off from time slot number 1 which is the first time slot following the sync pulse 54. The pulse train is then inverted, as shown in FIG. 4B in order to compensate for rise and fall time distortion. Referring to FIG. 4C, a new sync pulse 56 is generated in such a manner as to create one or more new time slots at the end of the pulse train containing the information to be transmitted from the first subscriber terminal 16 and corresponding to output channel number 1 et. seq. at the central exchange office receiver terminal 18. The new information is included in the time slots numbered 1 through 25, following the last time slot numbered 999 of the originally transmitted signal, and preceding the new sync pulse 56, which defines the end of the present frame and the beginning of the next frame. In this preferred embodiment, twenty-five time slots relate to each subscriber terminal. The new sync pulse 56 is extended to the end of received time slot number 25. Thus, the information corresponding to input channel number 26 contained in time slot number 26 occupies the first time slot following the sync pulse 56 in the new pulse train (FIG. 4C). The new pulse train is then transmitted over the wideband circuit 14 to the next series-connected subscriber terminal 16. This process of tapping-off, inverting and retransmitting is repeated at each subscriber terminal 16 until the pulse train contains only information to be transmitted from the subscriber terminals 16 to the receiver terminal 18 at the central exchange office 40. Since no information is carried in the signal amplitude, the signal can be completely regenerated at each subscriber terminal 16 location, thus eliminating the need for a large number of pulse regenerators 26 between terminals 10, 16, 18. Also, since no information is carried in the signal amplitude, degradation of the signal between terminals 10, 16, 18 or regenerators 26 is not critical, so long as the intervals between zero-axis crossings are maintained.

The construction and operation of the transmitter terminal 10, the subscriber terminals 16, and the receiver terminal 18, used in an exemplary embodiment of the closed loop system (FIG. 2) of the present invention will now be discussed in greater detail. The values of the resistors, capacitors and inductors which may be used in this exemplary embodiment are shown on the various FIGS. of the Drawing. Unless otherwise indicated, resistance values are in ohms, and capacitance values are in microfarads. The "K" or "M" suffix to a resistance value stands for kilohms or megohms respectively. The "*p*" suffix to a capacitance value stands for picofarads. Inductance values are in henries "H" or microhenries "$\mu$H" as indicated in the Drawing.

Unless otherwise indicated, vertical rectangles are used to identify flip-flops. These flip-flops are identified in the Drawing as either R-S or J-K flip-flops. Standard circuit element symbols are used throughout. Emitter coupled logic is used throughout. Paired voltage comparators and line receivers are both represented by a triangle such as by symbol 110 in FIG. 6 and symbol 76 in FIG. 5 respectively. However, in FIG. 17, the triangular symbol 330 represents high frequency broad band amplifier, such as is manufactured by Motorola Company, Model No. MC 1545L.

Figures 16, 16A, 16B:
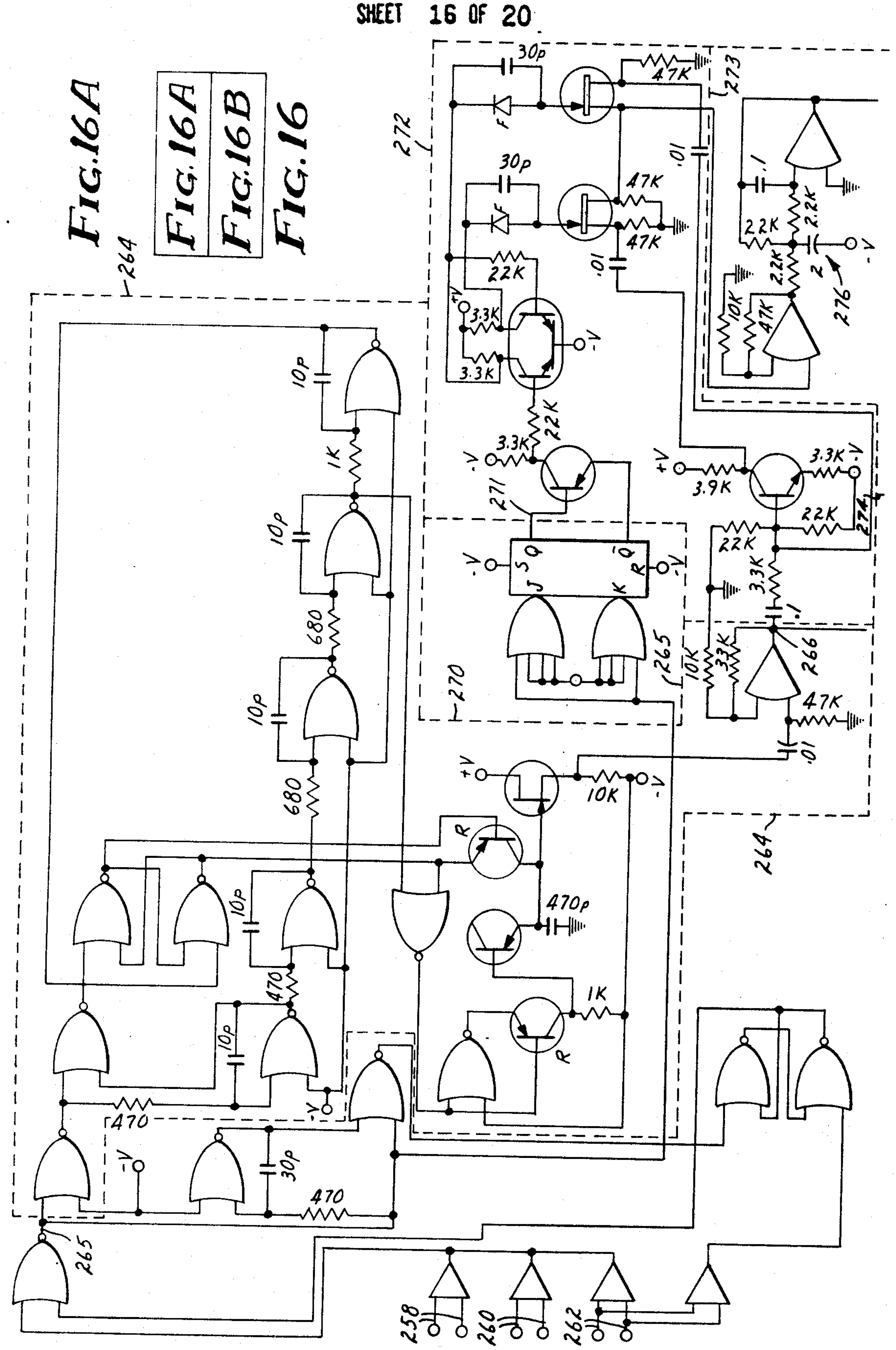
FIGS. 16A and 16B taken together as in FIG. 16 are a combined block and logic circuit diagram of an interface circuit which is used for interfacing the terminals of a central telephone exchange with the modulator circuit included in the transmitter terminal shown in FIG. 5 and with the decade decoder circuit included in the receiver terminal shown in FIG. 13. The synchronous detector circuit for providing a supervisory signal is shown in FIGS. 16A and 16B.
Figure 16B:
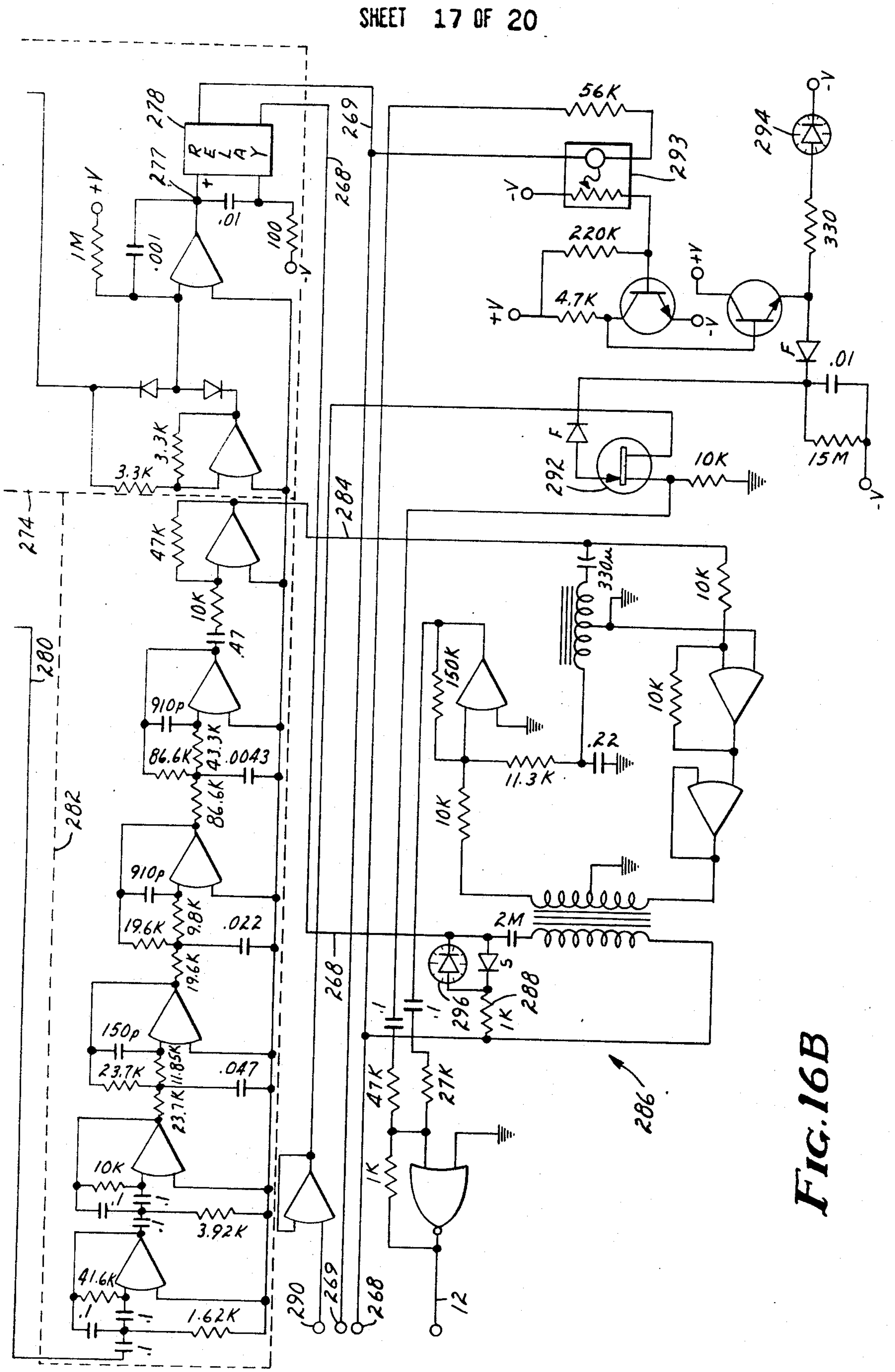

Except where identified with "S" or "F" symbols, germanium diodes are used. S-identified diodes are silicon diodes; and F-identified diodes are fast responding diodes, such as those manufactured by Fairchild Semiconductor Company, Model No. FD 100. Fast responding transistors are identified by the symbol "R". These fast responding transistors are manufactured by Motorola Company, Model No. MM4208. Other specially selected transistors are identified on the Drawing by their Motorola model number. The relays 220 and 226 shown in FIG. 12B and 278 in FIG. 16B are manufactured by Teledyne Company, Model No. 640. When these relays are turned on, the two leads on the right are connected together. All voltage bias levels +V and −V are +5 volts and −5 volts, respectively. All $V_{bb}$ bias voltage sources are set at about −1.17 volts. The Logic 1 bias voltage level (FIG. 6) is about −0.77 volts.

Figure 5:
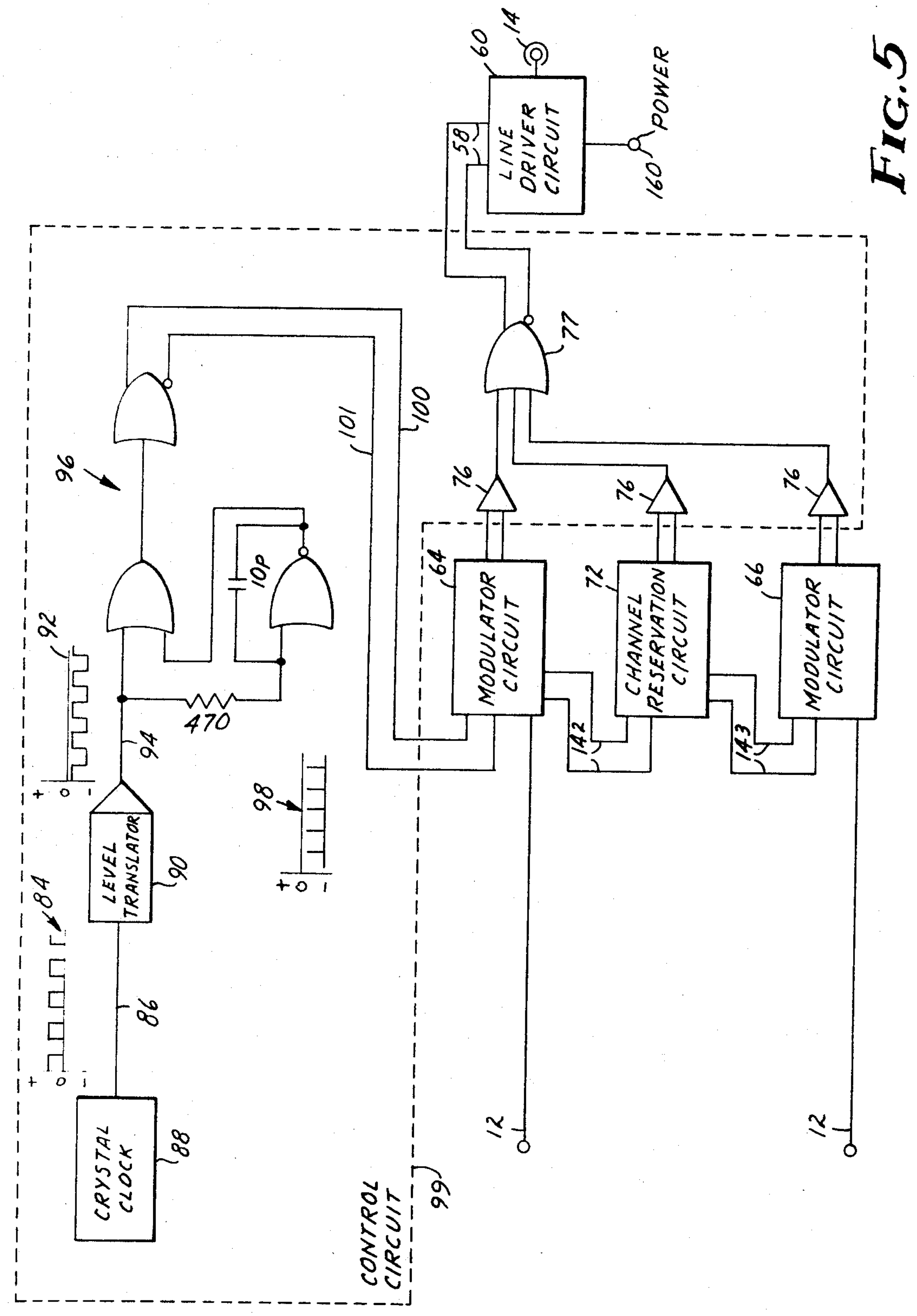
FIG. 5 is a combined block and logic circuit diagram of the transmitter terminal shown in FIGS. 1–3.

Referring first to the transmitter terminal 10 which is shown in FIG. 5, the analog input signals are received on the input channels 12. The time-division multiplexed signal is furnished on the lines 58 through a coaxial cable line driver circuit 60 to the wideband circuit 14, such as the coaxial cable 14.

The use of coaxial cable tends to eliminate jitter interference and thereby also tends to eliminate the problem of changes in the intervals between zero-axis crossings during the course of signal transmission.

The modulator portion of the transmitter terminal 10 includes a number of modulator circuits 64 and 66 which provide signals in the form of a pulse train to the line driver circuit 60 for producing the time slots in the time-division multiplexed signal. All of the modulator channels provided by the modulator circuits 64, 66 are coupled to each other in tandem for serial operation in a predetermined order related to the serial order of the subscriber terminals 16. The durations of the time slots correspond to the analog signals received on the input channels 12.

There may be a plurality of modulator circuits 64 and corresponding input channels 12. Each of the modulator circuits 64 and corresponding input channels 12 has a 25 channel capacity.

Channel reservation circuits 72 are included among the modulator circuits 64 and 66 in appropriate locations in order to provide for further expansion of the system. The channel reservation circuits 72 are used when the predetermined number of time slots in each frame of the time-division multiplexed signal exceeds the number of input channels by a given number. The channel reservation circuits 72 are connected in tandem with the tandem connected modulator circuits 64 and 66. The channel reservation circuits 72 provide signals in the pulse train to the line driver circuit 60 for producing the given number of time slots, in the time-division multiplexed signal. The duration of each of the given number of time slots is of some predetermined relatively short minimum interval. In other words, each of the given number of pulses is provided at a predetermined minimum interval following the preceding pulse delivered to the differential output OR gate 77. The time slots which do not relate to any of the various input channels 12 are said to relate to non-working channels. Each channel reservation circuit 72 has a twenty-five channel capacity.

In an exemplary embodiment, wherein the transmitter terminal 10 is connected to 399 input channels 12, 15 of the modulator circuits 64, each having a 25 channel capacity, and one last modulator circuit 66 having 24 channels are combined with 24 channel reservation circuits 72 to provide the 999 time slots of the time-division multiplexed signal. All of the output lines from each of the modulator circuits 64, from the one last modulator circuit 66, and from each of the channel reservation circuits 72 are provided through line receivers 76 to a differential output OR gate 77. The outputs of the differential output OR gate 77 are connected by the lines 58 to the line driver circuit 60. Power for operating the subscriber terminals 16 and regenerators 26 is supplied at terminal 160 and fed through the line driver 60 onto the coaxial cable 14.

Now describing the operation of the transmitter terminal (FIG. 5), a clocking signal having a predetermined frequency, such as a 10 kilohertz clock pulse waveform 84, is provided on a line 86 from a clocking signal generator 88, such as a 10 kilohertz crystal clock 88, to a level translater 90, from which a negatively biased waveform 92 is provided on a line 94 to a one-shot multivibrator 96. A waveform 98, consisting of framing pulses provided at the predetermined frequency, such as the 10 kilohertz rate, is provided on a line 100 from the one-shot multivibrator 96. Although a sampling rate of 10 kilohertz is used in this preferred embodiment, other sampling rates may also be appropriate, in which case a crystal clock 88 providing a signal at some other appropriate frequency would be used. The transmitter terminal control circuit is shown in FIG. 5 as being within the dashed lines 99.

The logic level of the framing pulse waveform on the line 100 is opposite from the logic level of the framing pulse waveform on the line 101. The framing pulse waveforms on these two lines 100 and 101 are conveyed to the modulator circuit 64 which is shown in detail in FIG. 6.

Figure 6:
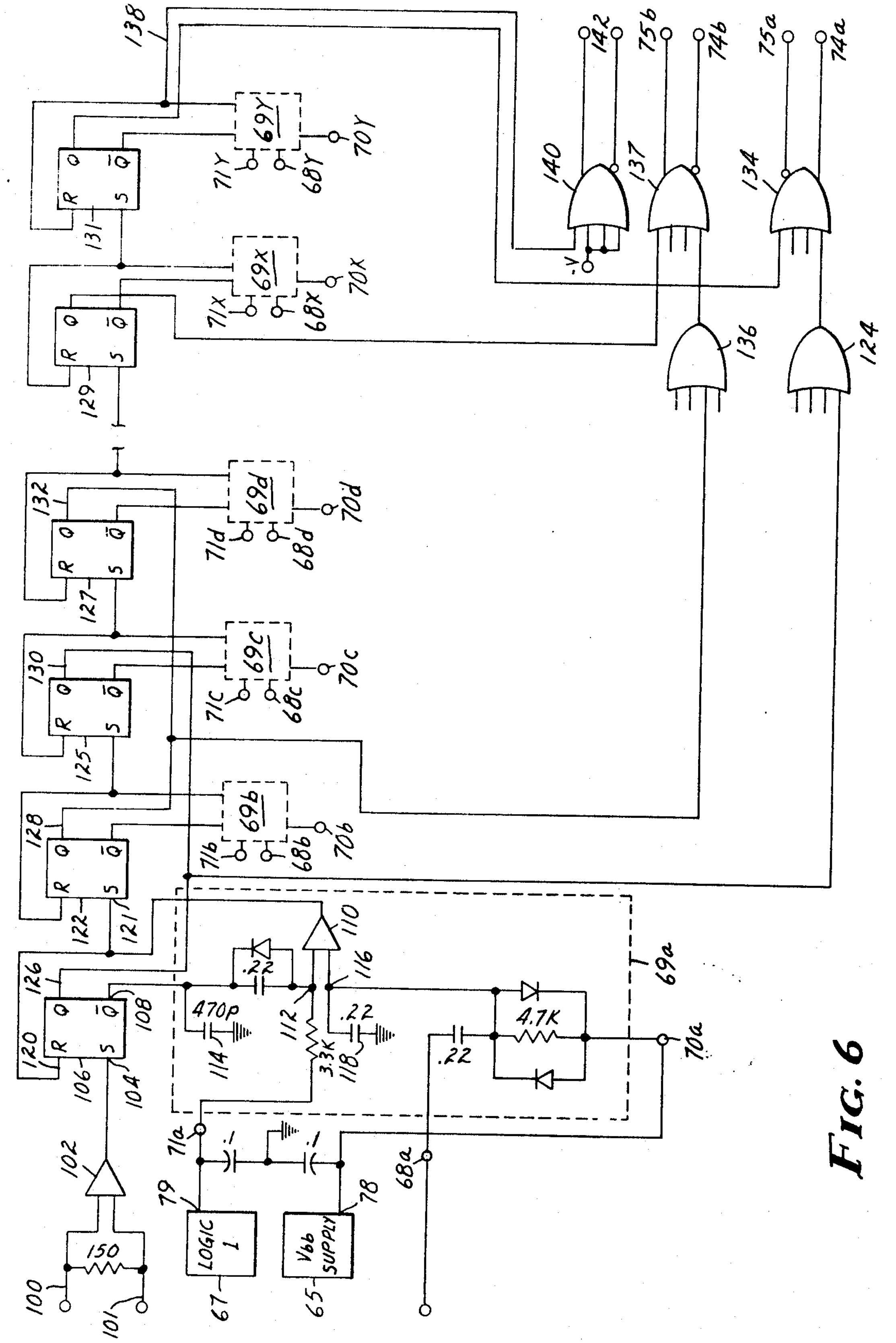
FIG. 6 is a combined logic and schematic circuit diagram of the modulator circuit included in the transmitter terminal shown in FIG. 5 and in the subscriber terminal shown in FIG. 7.
Figure 6A:
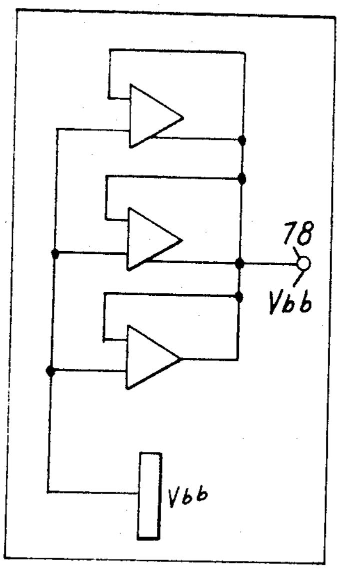
FIG. 6A is a combined logic and schematic circuit diagram of the $V_{bb}$ supply circuit included in the modulator circuit shown in FIG. 6.
Figure 6B:
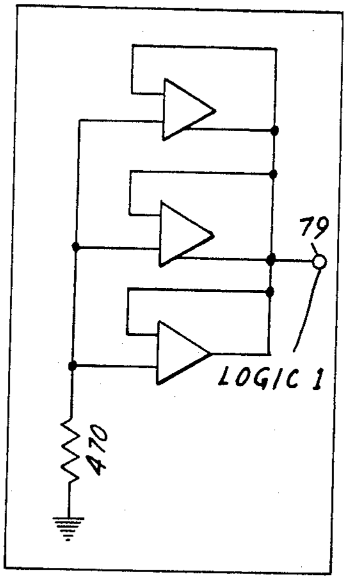
FIG. 6B is a combined logic and schematic circuit diagram of the logic 1 supply circuit included in the modulator circuit shown in FIG. 6.

Referring now to FIG. 6, the framing pulse waveforms are received on the lines 100 and 101 by the line receiver 102 from which a logic 1 signal is provided to the set input 104 of the first modulator channel flip-flop 106 in response to each framing pulse in the waveform 98. The analog input signals provided on the 25 channels illustrated collectively by the line 12 are separately provided to the terminals **68*a*, 68*b*, –, 68*x* and 68*y*, respectively. The circuitry corresponding to the middle modulator channels of the modulator circuit 64 are omitted from FIG. 6. The input network 69*a* is shown in detail for the first modulator circuit only and is shown schematically by dashed boxes 69*b*, 69*c*, etc. for the remaining modulator channels. Each modulator channel input network 69 also is connected to a $V_{bb}$ supply circuit 65 and a logic 1 supply circuit 67 at terminals 70 and 71 respectively. The $V_{bb}$ supply circuit 65 and the logic 1 supply circuit 67 are shown in detail in FIGS. 6A and 6B respectively, wherein $V_{bb}$ is provided at the terminal 78 and Logic 1 is provided at the terminal 79. It is seen that upon the receipt of a logic 1 framing pulse to the set input 104 of the flip-flop 106, a logic 0 output is delivered from the $\bar{Q}$ output 108 of the flip-flop 106, which in turn causes a logic 1 signal to be delivered from the output of a paired voltage comparator 110. The first modulator channel includes the flip-flop 106 and paired voltage comparator 110. The logic 1 output from the output of the paired voltage comparator 110 is not immediately delivered, however, but is delayed until the amplitude of the signal at the first input 112 of the paired voltage comparator 110, which signal is itself delayed by a capacitor 114, falls below the amplitude of the signal provided at the second input 116 of the paired voltage comparator 110 from the terminal 68*a* containing the sampled analog signal. Capacitor 118 is a noise filter. The logic 1 signal delivered from the output of the paired voltage comparator 110 is received at the reset input 120 of the flip-flop 106 and at the set input 121 of the second modulator channel flip-flop 122. The logic 1 pulse received at the reset input 120 of the first modulator channel flip-flop 106 causes a logic 1 signal to be delivered from the $\bar{Q}$ output 108 to the first input 112 of the paired voltage comparator 110 and thus terminates the logic 1 output signal from the paired voltage comparator 110 as a short duration pulse. The Q output 126 of the first modulator channel flip-flop 106 is connected to an input of the OR gate 124. The Q outputs of the other odd numbered modulator channel flip-flops 125, 131, –, are connected to the inputs of the OR gates 124 or 134 as shown in FIG. 6, while the Q outputs of the even numbered modulator channel flip-flops 122, 127, 129 are connected to the inputs of the OR gates 136 and 137** as also shown. The logic 1 pulse received at the set input 121 of the second modulator channel flip-flop 122 initiates the sampling of the analog signal from the input channel 12 at the terminal 68*b*. This procedure is successively repeated at each modulator channel flip-flop and paired voltage comparator combination of the modulator circuit 64, with the durations of the logic 1 pulses on the respective Q output lines 126, 128, 130 and 132 to the respective OR gates 124 and 136 corresponding to the respective amplitudes of the analog signals being received at the terminals 68*a*, 68*b*, 68*c* and 68*d*.

The combined Q outputs of the odd numbered modulator channel flip-flops are thus provided on the lines 74*a* and 75*a;* and the combined Q outputs of the even numbered modulator channel flip-flops are provided on the output lines 74*b* and 75*b*. When the modulator circuit 64 corresponds to an odd numbered group of modulator channels such as 1–25, 51–75, etc., the output lines 74*a* and 75*a* are connected to the line receiver 76 shown in FIG. 5. When the modulator circuit 64 corresponds to an even numbered group of modulator channels such as 26–50, 76–100, etc., the output lines 74*b* and 75*b* are connected to the line receiver 76. The modulator circuits 64 are so connected to the line receivers 76 in such an alternative manner in order that the last time slot provided from a given modulator circuit 64 may be distinguished from the first time slot of the next sequentially connected modulator circuit 64.

The output signal on a line 138 from the output of the paired voltage comparator for the last channel of the modulator circuit 64 is provided to an OR gate 140 from which it is delivered to a next tandem coupled modulator circuit 64, 66, or, in those cases wherein the next 25, or multiple of 25, channels in the series of 999 channels are not used, then this output signal is provided on the lines 142 to a channel reservation circuit 72.

Again referring to FIG. 5, the pulse trains from each of the modulator circuits 64, 66 and channel reservation circuits 72 are transmitted through individually connected line receivers 76 and through the differential output OR gate 77 to the line driver circuit 60, wherein the series of pulse trains is inverted to provide on the wideband circuit 14 a signal having the waveform such as shown in FIG. 4A or 4C, wherein the sync pulse is produced in the absence of a time-slot pulse furnished in response to information on an input channel 12.

Power which is fed over the coaxial cable 14 to operate the subscriber terminal 16 and regenerators 26 is applied on line 160 through the coaxial cable line driver 60.

Figure 7:
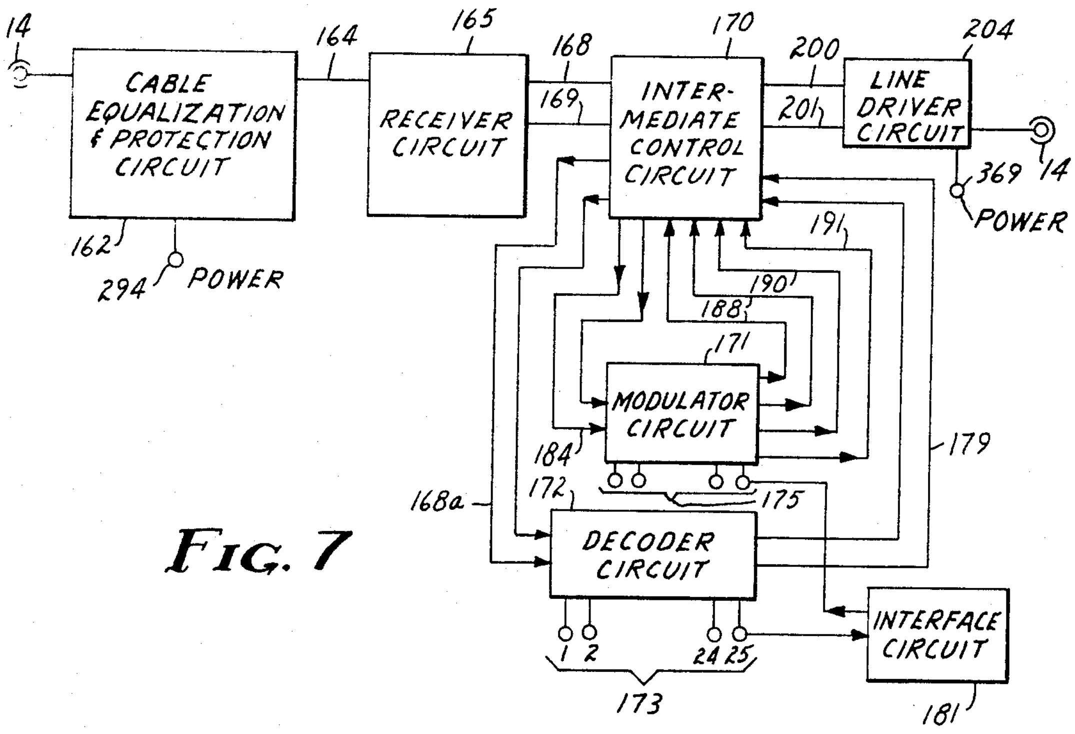
FIG. 7 is a block circuit diagram of a typical subscriber terminal shown in FIGS. 1–3.
Figures 12, 12A:
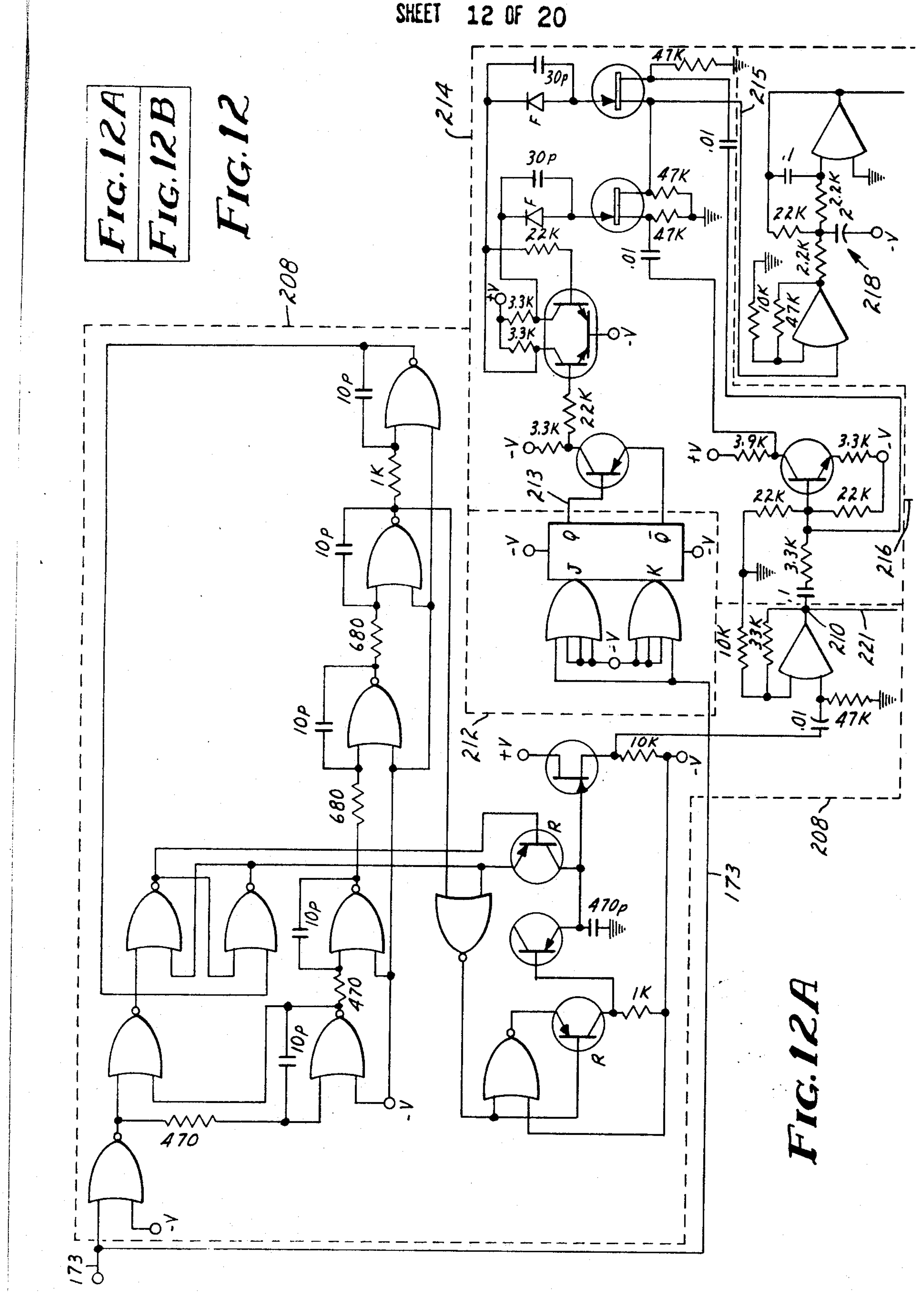
FIGS. 12A and 12B taken together as in FIG. 12 are a combined logic and schematic circuit diagram of an interface circuit which is used for interfacing the subscribers' telephone sets with the decoder circuit and the modulator circuit included in the subscriber terminal shown in FIG. 7. The synchronous detector circuit for detecting a supervisory signal is shown in FIGS. 12A and 12B.
Figure 12B:
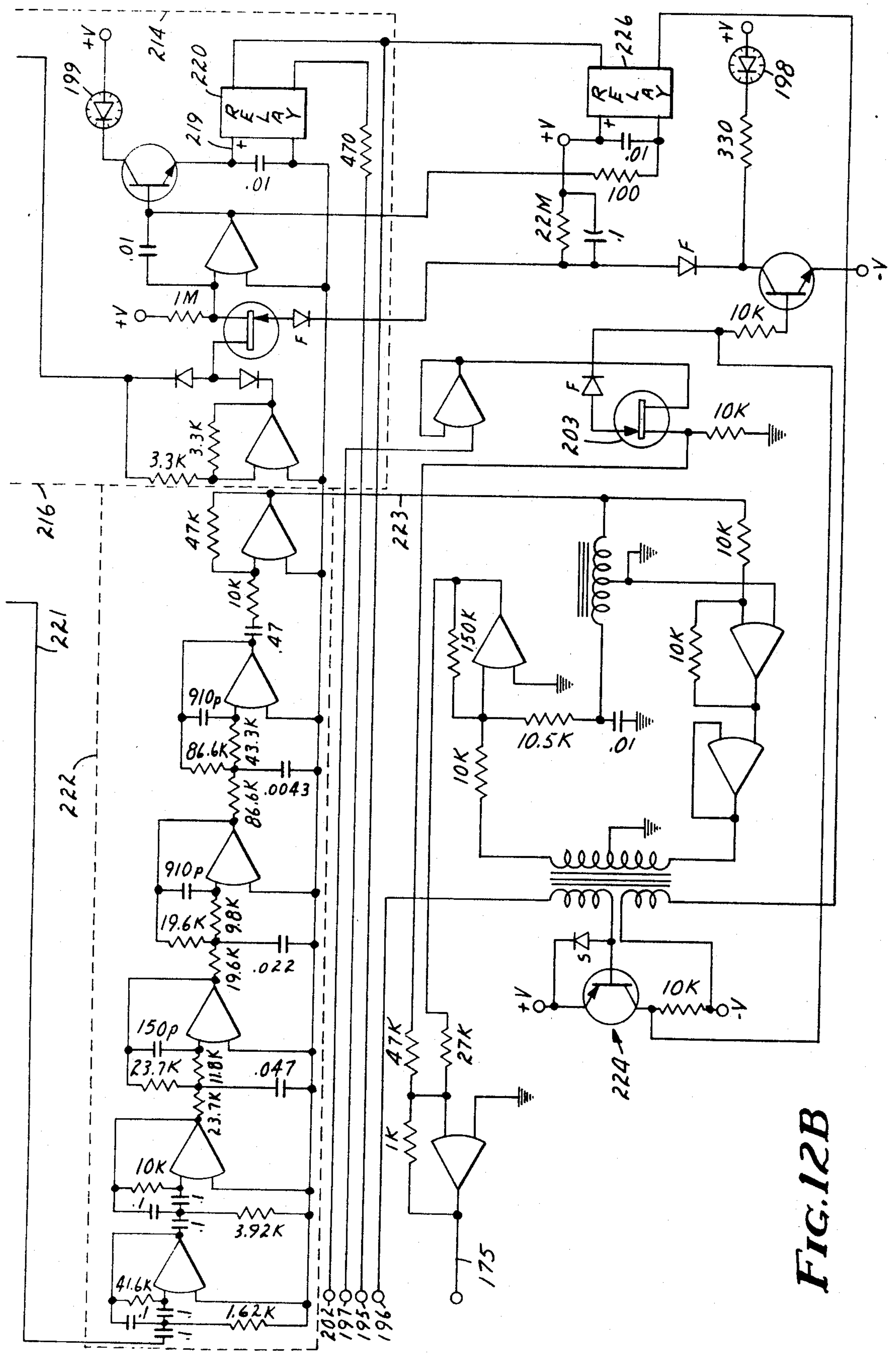

Referring to FIG. 7, wherein the subscriber terminal 16 is shown diagramatically, a time-division multiplexed signal is received from the wideband circuit 14 through a cable equilization and protection circuit 162 onto a line 164. The cable equilization and protection circuit 162 couples the subscriber terminal unit to the coaxial cable 14. The signal on the line 164 from the cable equilization and protection circuit 162 is fed through a receiver circuit 165 wherein the signal is shaped. For purposes of demodulation, the received time-division multiplexed signal is first fed over a line pair 168 and 169 from the receiver circuit 165 to an intermediate control circuit 170. The intermediate control circuit 170 is connected to a twenty-five channel modulator circuit 171 and a decoder circuit 172 having 25 output channels 173. Each output channel 173 of the decoder circuit 172 and each input channel 175 of the modulator circuit 171 is connected to an interface circuit 181 such as is shown in FIGS. 12A, 12B. One interface circuit 181 is provided for each individual subscriber channel. In FIG. 7, only channel number 25 is shown as connected to the interface circuit 181. The intermediate control circuit 170 is shown in detail in FIGS. 8A and 8B. The modulator circuit 171 is shown in detail in FIG. 6 which was discussed above. The decoder circuit is shown in detail in FIGS. 9A and 9B.

The time-division multiplexed signal retransmitted from the subscriber terminal 16 is provided on the lines 200 and 201 from the intermediate control circuit 170 through the line driver circuit 204 onto the coaxial cable 14.

Figures 9, 9A, 9B:
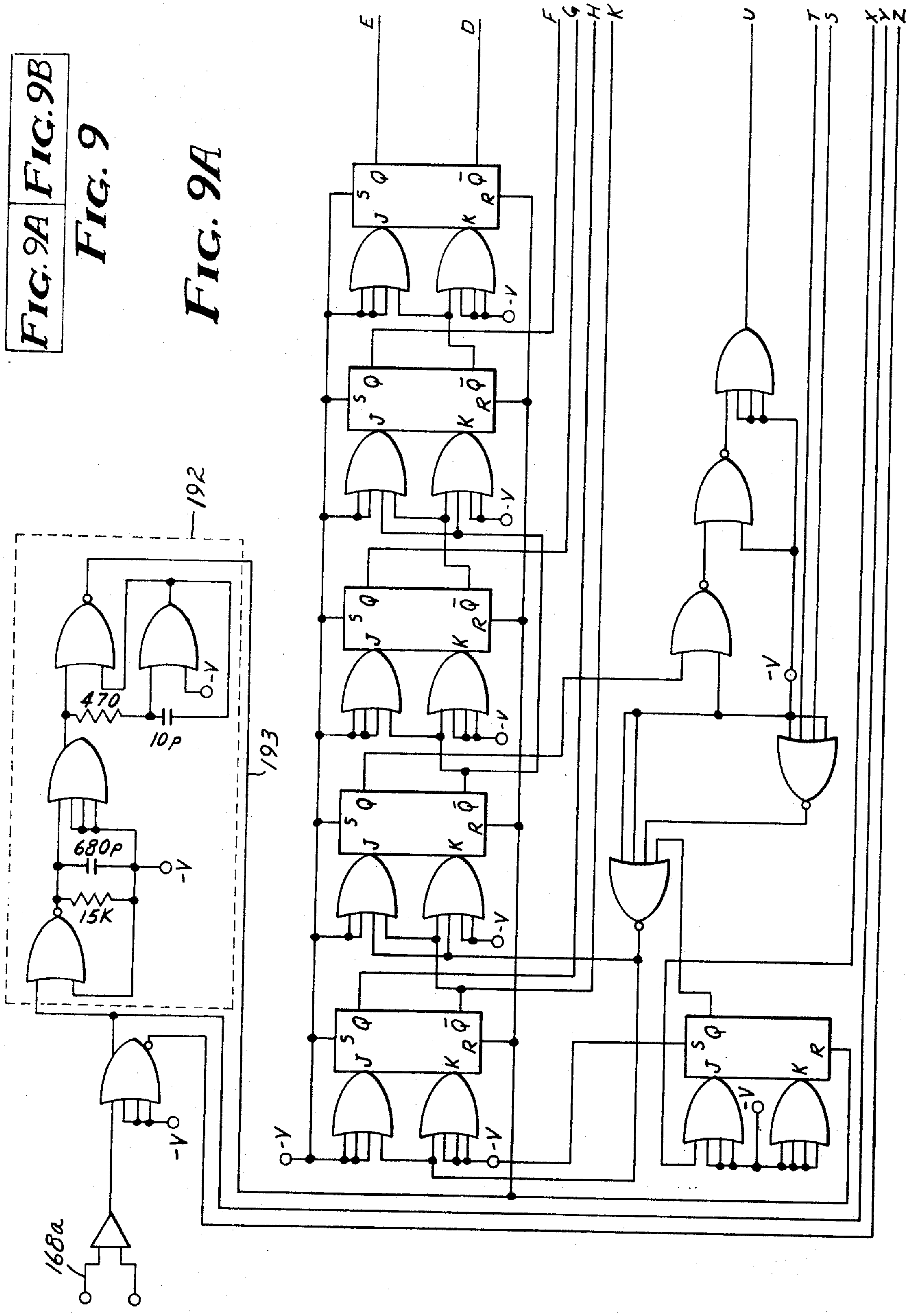
FIGS. 9A and 9B taken together as in FIG. 9 are a combined logic and schematic circuit diagram of the decoder circuit included in the subscriber terminal shown in FIG. 7.
Figure 9B:
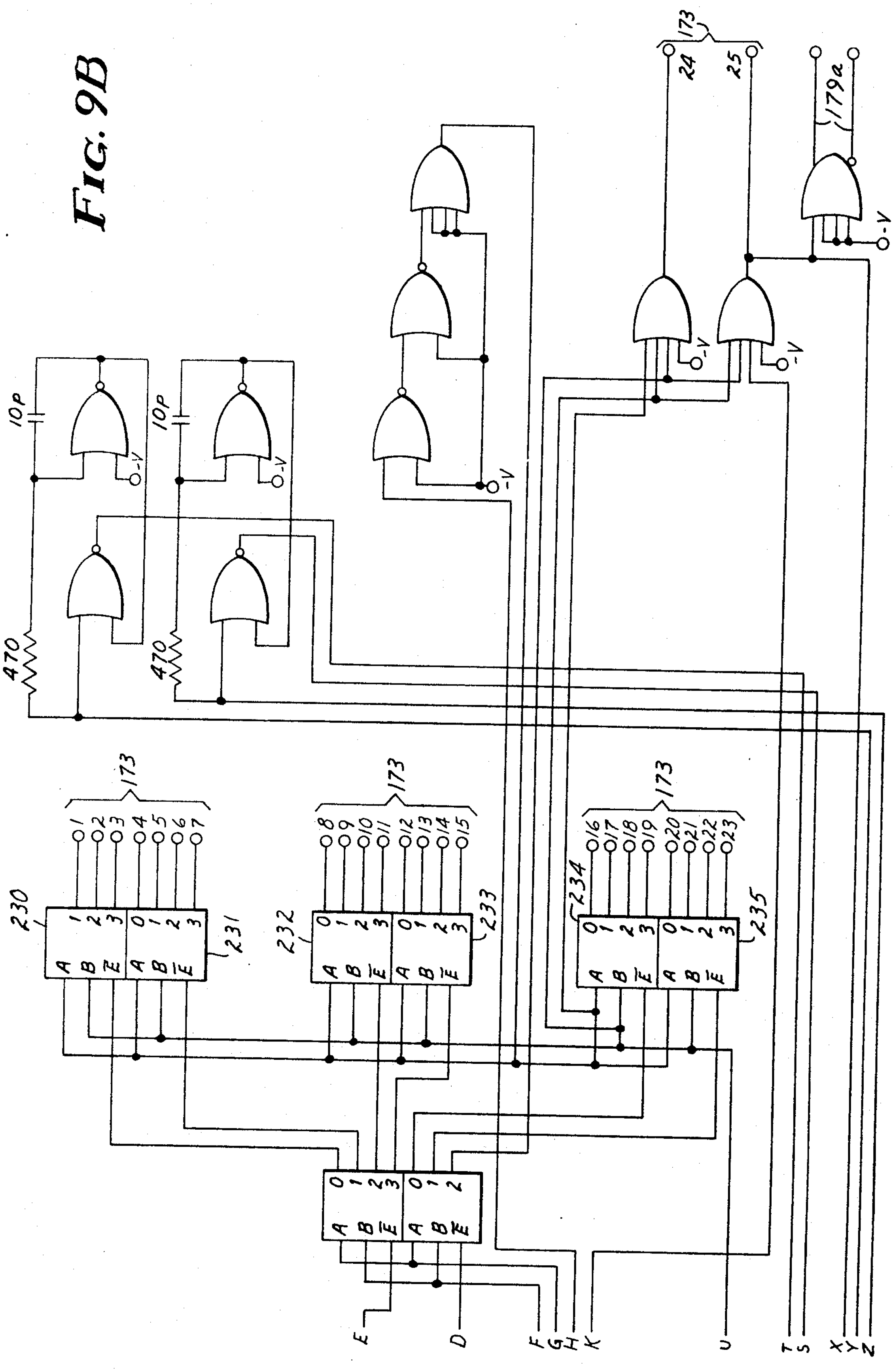
Figure 10:
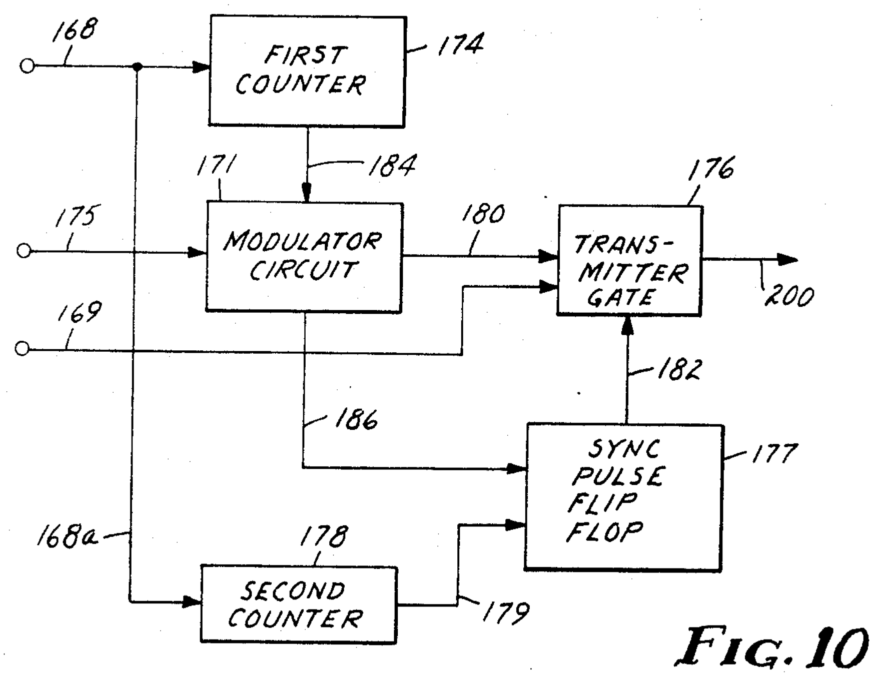
FIG. 10 is a block diagram of the transmitting means of the subscriber terminal and shows a combination of components also shown separately in FIGS. 6, 8 and 9.

Now, to explain the operation of the transmitting means of the subscriber terminal 16 in accordance with the present invention, reference is made to FIG. 10 wherein the essential components of this transmitting means are shown in combination with each other. A first counter 174, a transmitter gate 176, and a sync pulse flip-flop 177 are all contained in the intermediate control circuit 170 shown in detail in FIGS. 8A and 8B. A second counter 178 is contained in the decoder circuit shown in detail in FIGS. 9A and 9B. The modulator circuit 171 is shown in detail in FIG. 6.

Figure 11A:
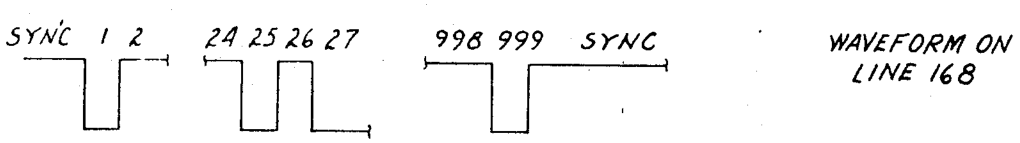
FIGS. 11A, 11B, 11C, 11D and 11E are waveforms of signals present at various portions of the transmitting means shown in FIG. 10.

The time-division multiplex signal is received on the lines 168 and 169 from the receiver circuit 165 as shown in FIG. 7. When the sync pulse of the time-division multiplex signal FIG. 11A, is received, both the first counter 174 and the second counter 178 are cleared and the sync pulse is passed into and through the transmitter gate 176. The time-division multiplex signal is also received in an inverted form, FIG. 11B, on the line 169. The transmitter gate 176 provides an output signal, FIG. 11E, which is a composite of the signals provided on the line 180 from the modulator circuit 171, FIG. 11C, the inverted input line 169 from the receiver circuit 165, FIG. 11B, and the line 182 from the sync pulse flip-flop 177, FIG. 11D.

Figure 11B:
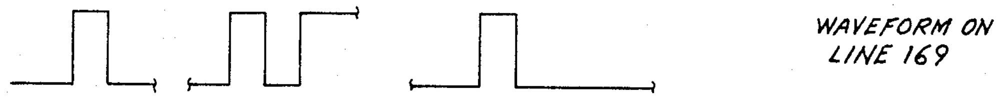
Figure 11C:
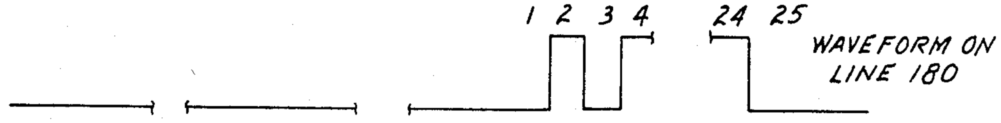

The wave form of the signal from the modulator circuit 171 is shown in FIG. 11C. This signal remains down, i. e. at binary 0 until the first counter 174 delivers a signal on the line 184 thereby indicating that 999 time slots have been counted. The modulator circuit 171 is then enabled to provide a time-division multiplex signal wherein the durations of the time slots correspond to the information received on the 25 input lines 175 to the modulator circuit 171. The input lines 175 correspond to the input lines 12 shown in FIG. 6.

The inverted time-division multiplex signal received on the line 169 is shown in FIG. 11B.

Figure 11D:
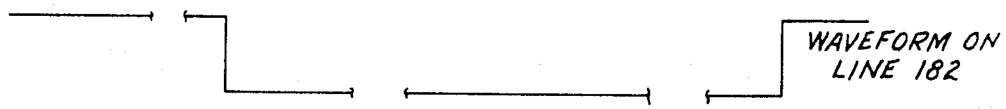

The signal from the sync pulse flip-flop 177 is shown in FIG. 11D. The output from the sync pulse flip-flop 177 is at a high or binary 1 level until the sync pulse flip-flop 177 is reset in response to a signal on the line 179 from the second counter 178 indicating that the 25th time slot of the time-division multiplex signal on the line 168a is being received. The output signal on the line 182 from the sync pulse flip-flop 177 then goes to a low level or binary 0, commencing at the beginning of the 25th time slot. This signal from the sync pulse flip-flop 177 remains at the low or binary 0 level until the sync pulse flip-flop 177 is set in response to a signal from the modulator circuit 171 which is delivered on the line 186 after the time slot for the 25th new channel has been provided therefrom 64 on the line 180.

Figure 11E:
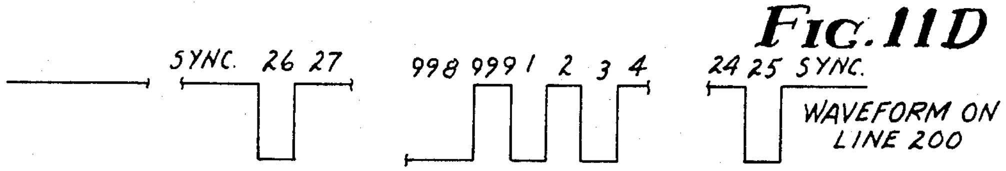

An output signal from the transmitter gate 176 is shown in FIG. 11E. The transmitter gate 176 provides what is an essentially OR output combination of the three signals FIGS. 11B, 11C, 11D furnished thereto. Thus, during the first 24 time slots while the signal FIG. 11D from the sync pulse flip-flop 177 remains high, the output signal FIG. 11E from the transmitter gate 176 remains high. During the 25th time slot the inverted time-division multiplex signal, FIG. 11B, is high, thus the output signal, FIG. 11E, from the transmitter gate 176 remains high. During the remainder of the time during which the 999 time slots are received, both the signal, FIG. 11C, on the line 180 from the modulator circuit 171 and the signal, FIG. 11D, on the line 182 from the sync pulse flip-flop 177 are low; thus the transmitter gate 176 provides an output signal, FIG. 11E, which is identical to the inverted time-division multiplex signal, FIG. 11B, on the line 169. After the 999th time slot, the inverted time-division multiplex signal, FIG. 11B, on the line 169 contains an inverted sync pulse which is at a down or binary 0 level. Also, after the 999th time slot, the modulator circuit 171 is enabled to provide a time-division multiplex signal, FIG. 11C, corresponding to the signals received on the input lines 175 to the modulator circuit 171. At the end of the 25th new time slot, as determined by the analog value of the information provided on the input lines 175, a set pulse is provided on the line 186 to the sync pulse flip-flop 177 which in turn causes a signal, FIG. 11D, on the line 182 from the sync pulse flip-flop 177 to assume a high or binary 1 level. Thus, a sync pulse is then provided on the output line 200 from the transmitter gate 176. This sync pulse persists until the cycle is repeated upon the beginning of the 25th time slot in the next frame received on the lines 168 and 169 from the receiver circuit 165.

Power for operating the subscriber terminal 16 is received from the coaxial cable 14 at terminal 294 connected to the cable equilization and protection circuit 162. This power is further transmitted to regenerators 26 and to other subscriber terminals 16 by applying the same to the terminal 369 of the line driver circuit 204 for transmission onto the coaxial cable 14.

Figures 8, 8A:
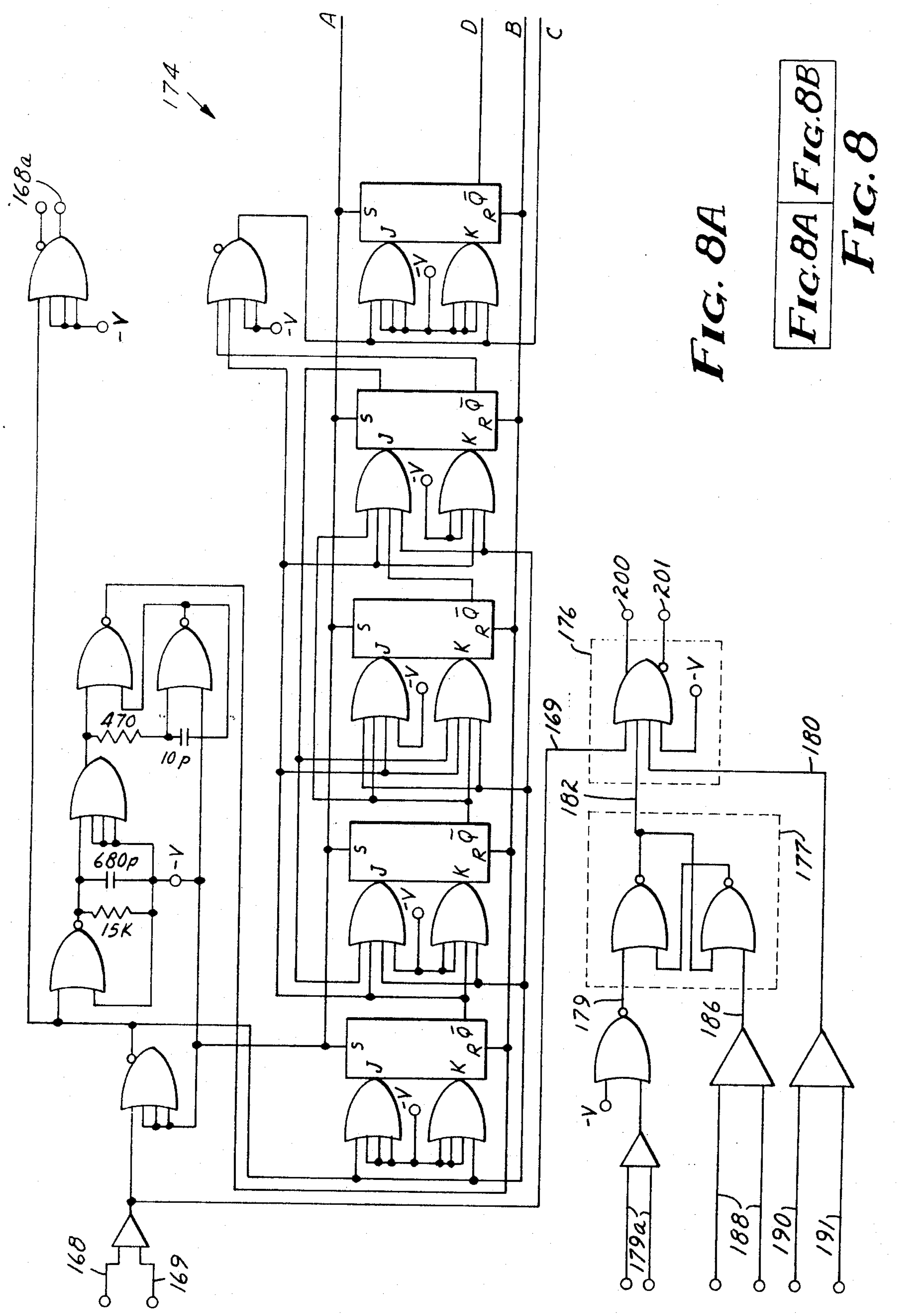
FIGS. 8A and 8B taken together as in FIG. 8 are a combined logic and schematic circuit diagram of the intermediate control circuit included in the subscriber terminal shown in FIG. 7.
Figure 8B:
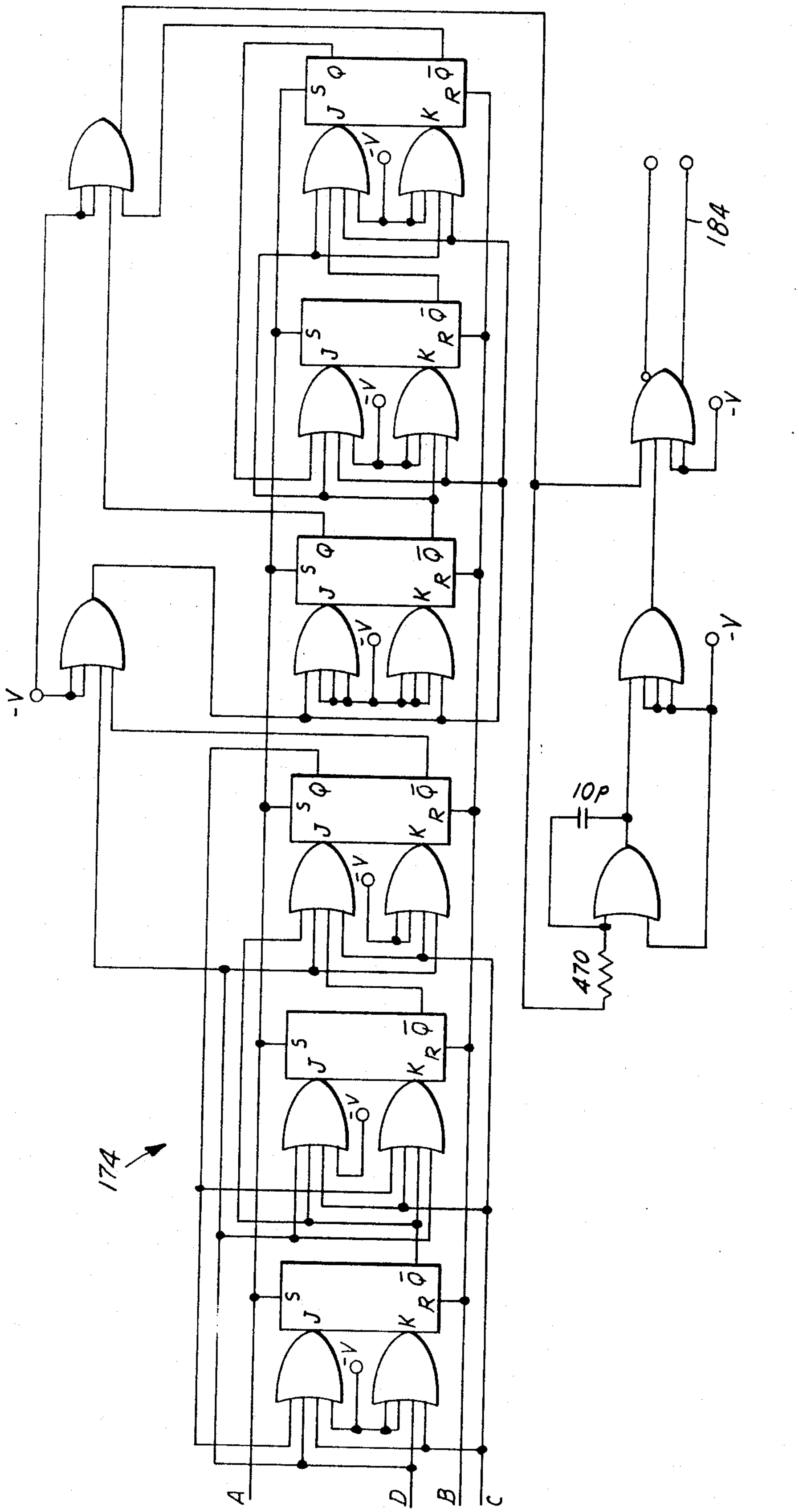

Referring to FIG. 8A, input lines 188 and 190, 191 respectively correspond to the output lines 142, 74, 75 shown in FIG. 6.

Referring to FIGS. 9A and 9B, each separate output channel 173 is identified in FIG. 9B by its sequential location in relation to the time slots of the time-division multiplex signal received on line **168*a* shown in FIG. 9A. The first twenty-three output channels 173 are provided from dual-binary-to-one-of-four decoders 230, 231, 232, 233, 234, and 235, which are manufactured by Motorola Company, Model No. MC1242L. The circuit 192 in FIG. 9A is a reset circuit 192, from which a reset pulse is provided on the line 193.**

A subscriber terminal interface circuit 181 is shown in detail in FIGS. 12A and 12B. The time-division multiplexed signal is received on the input channel 173, the demodulator circuit 208 demodulates this signal and provides a composite output signal at a terminal 210.

When the system of the present invention is used to provide telephone services, the pulsed signal (time-division multiplexed signal) received at the interface circuit 181 contains a first type of information such as audio information, derived from a first input base band signal, such as an audio input signal, within a first base frequency band such as 250 Hertz to 4 KHz., and a second type of information such as supervisory information, derived from a second input signal such as a supervisory signal at a second frequency outside the first base frequency band such as 5 KHz. The composite output signal at terminal 210 produced by demodulation of the pulsed signal in the demodulator circuit 208 then contains both the audio information within the frequency range of 250 Hz. to 4 KHz. and the supervisory information at the frequency of 5 KHz.

In accordance with the second aspect of the present invention as noted above under the heading "Field of the Invention", the composite output signal at terminal 210 is treated in a synchronous detector circuit to provide a signal corresponding to the supervisory information, onto the telephone line 195.

The synchronous detector circuit, which comprises a first circuit 212, a second circuit 214 and a third circuit 216, produces an output signal corresponding to the supervisory information, onto the lines 195 whenever the composite signal at the terminal 210 contains second frequency components such as 5 KHz components, in synchronization with the pulsed signal present on the line 173.

The first circuit 212 detects the pulsed signal from the line 173 and generates on the line 213, a first signal at the second frequency of 5 KHz which is in synchronization with the pulsed signal on the line 173.

The second circuit 214 mixes the composite signal from the terminal 210 and the first signal from the line 213 to produce on the line 215 a second signal which will contain a DC component whenever the composite signal at the terminal 210 contains supervisory information at the second frequency of 5 KHz.

The third circuit 216 detects the DC component in the second signal on the line 215 and produces an output signal such as a ringing signal onto the telephone line 195 in response thereto.

Within the third circuit 216, the second signal from the line 215 is filtered in the filter circuit 218 to filter out the AC components of the mixed signal and thereby leave only the DC component. When this DC component appears on input line 219 to relay 220, the relay 220 is triggered to close, and thereby place the ringing signal which is constantly present on the line 197, onto the telephone line 195.

To provide an audio output signal, the composite output signal at the terminal 210 is transferred via line 221 to an audio filter circuit 222, from which a filtered audio signal is provided on line 223. The filtered audio signal on the line 223 is fed through the telephone coupling circuit 224 and is thereby placed out across the telephone lines 195 and 196.

Audio information received in on the telephone line pair 195 and 196 is transferred through the telephone coupling circuit 224 and placed on an input channel 175 which is connected to the modulator circuit 171 of the subscriber terminal 16 (FIG. 7).

When an off-hook supervisory signal is received in on the telephone lines 195 and 196, the field effect transistor (FET) 203 is turned on. While the FET 203 is turned on, the 5 KHz square wave off-hook supervisory signal from the supervisory signal input line 202 is fed through the FET 203 onto the input channel 175. Light emitting diode (LED) 198 provides a visual indication when the off-hook signal is applied across the lines 195 and 196. When the relay 220 is turned on, relay 226 is turned off, thereby isolating the telephone coupling circuit 224 from the high voltage of the ringing signal on the line 195.

LED 199 lights up to *provide an* indication when a ringing signal is placed onto the *telephone line* 195 from the relay 220.

The receiver terminal 18, which is diagramatically shown in FIG. 13 will now be discussed. The receiver terminal includes a cable equalization and protection circuit 240, a receiver circuit 242, a decoder driver circuit 244 and a decade decoder circuit 246. The decade decoder circuit 246 includes a units decade decoder 248, a tens decade decoder 250 and a hundreds decade decoder 252. Single decade decoder circuit output channels 254 from each of the decade decoders 248, 250 and 252 are combined and connected to single interface circuit 256 (FIG. 16) at the central office 40. Terminal 241 is a power terminal.

There is a separate central office interface circuit 256 (FIG. 16) for each time slot in the time-division multipliexed signal which corresponds to a connected channel in the subscriber communications system. As noted above, only 399 input channels 12 are so connected to the exemplary preferred embodiment. Thus, only 399 interface circuits (FIG. 16) are utilized.

Figure 13:
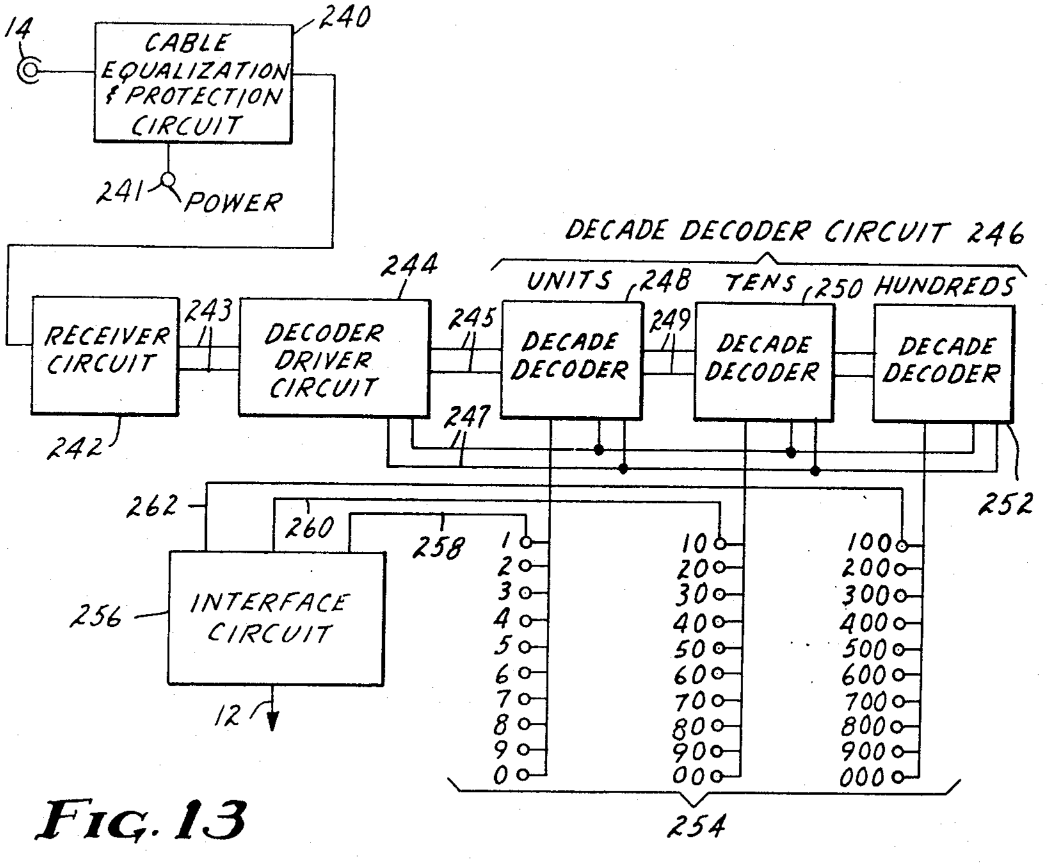
FIG. 13 is a block, circuit diagram of the receiver terminal shown in FIGS. 1–3.

In FIG. 13, only the decade decoder circuit output channels 254 corresponding to time slot 111 are shown to be in connection with the interface circuit 256.

An input channel 12 to the transmitter terminal 10 (FIG. 5) is also provided from each interface circuit 256 (FIG. 16).

Again referring to FIG. 13, the time-division multiplexed signal is received from the wideband circuit 14 by the cable equalization and protection circuit 240 which couples the receiver terminal 18 to the coaxial cable 14. This signal is then fed through the receiver circuit 242 where it is shaped and fed into decoder driver circuit 244 via lines 243.

Figure 14:
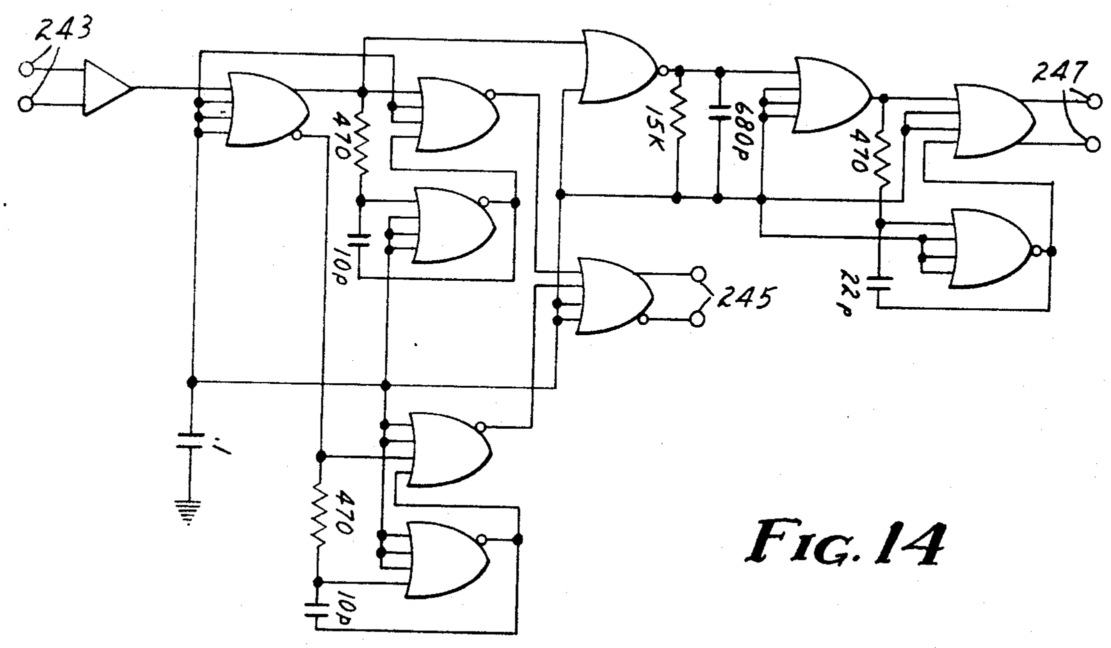
FIG. 14 is a combined logic and schematic circuit diagram of the decoder driver circuit included in the receiver terminal shown in FIG. 13.
Figure 15B:
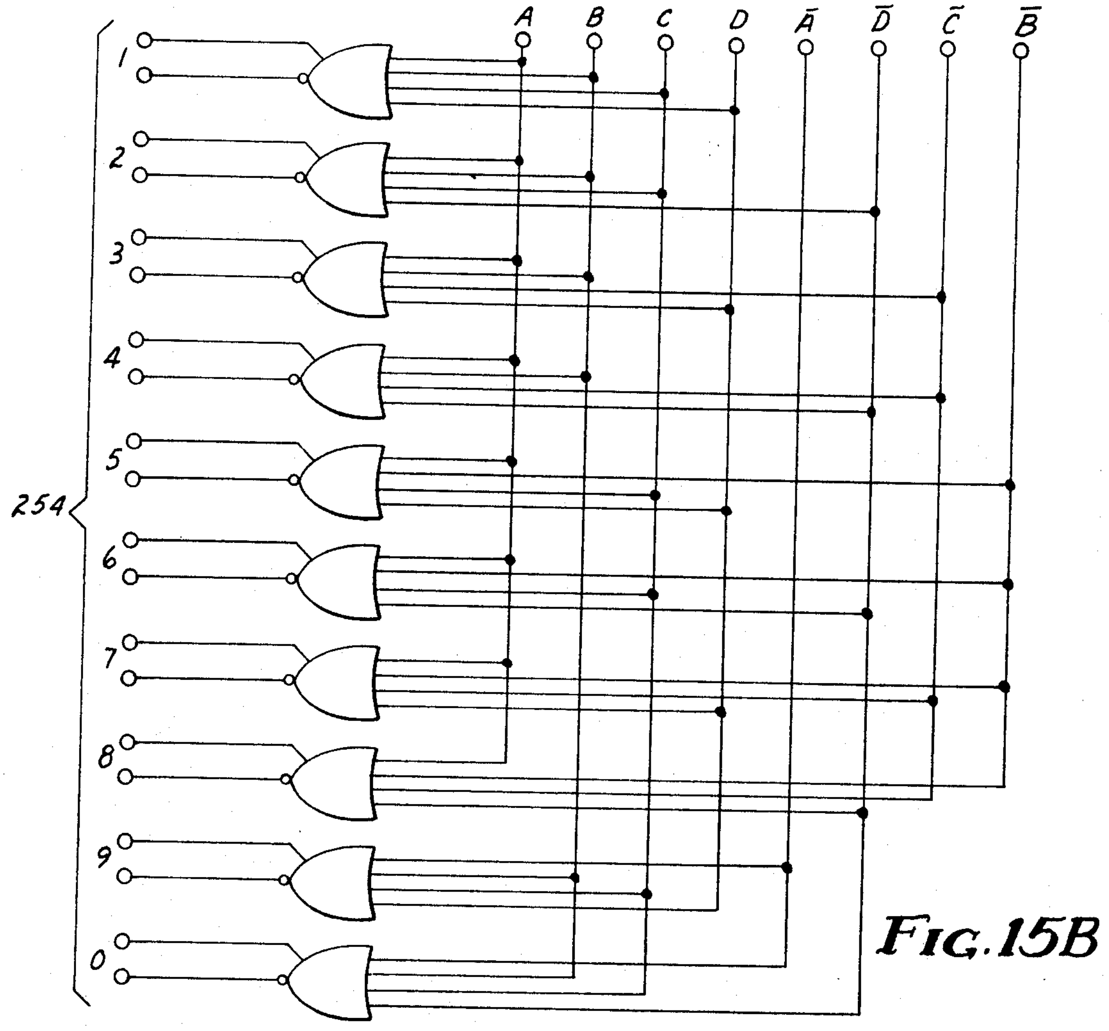
FIGS. 15A and 15B taken together in a manner wherein the commonly lettered terminals are connected together, are a combined logic and schematic circuit diagram of each of the decade decoders in the decade decoder circuit included in the receiver terminal shown in FIG. 13.
Figure 15A:
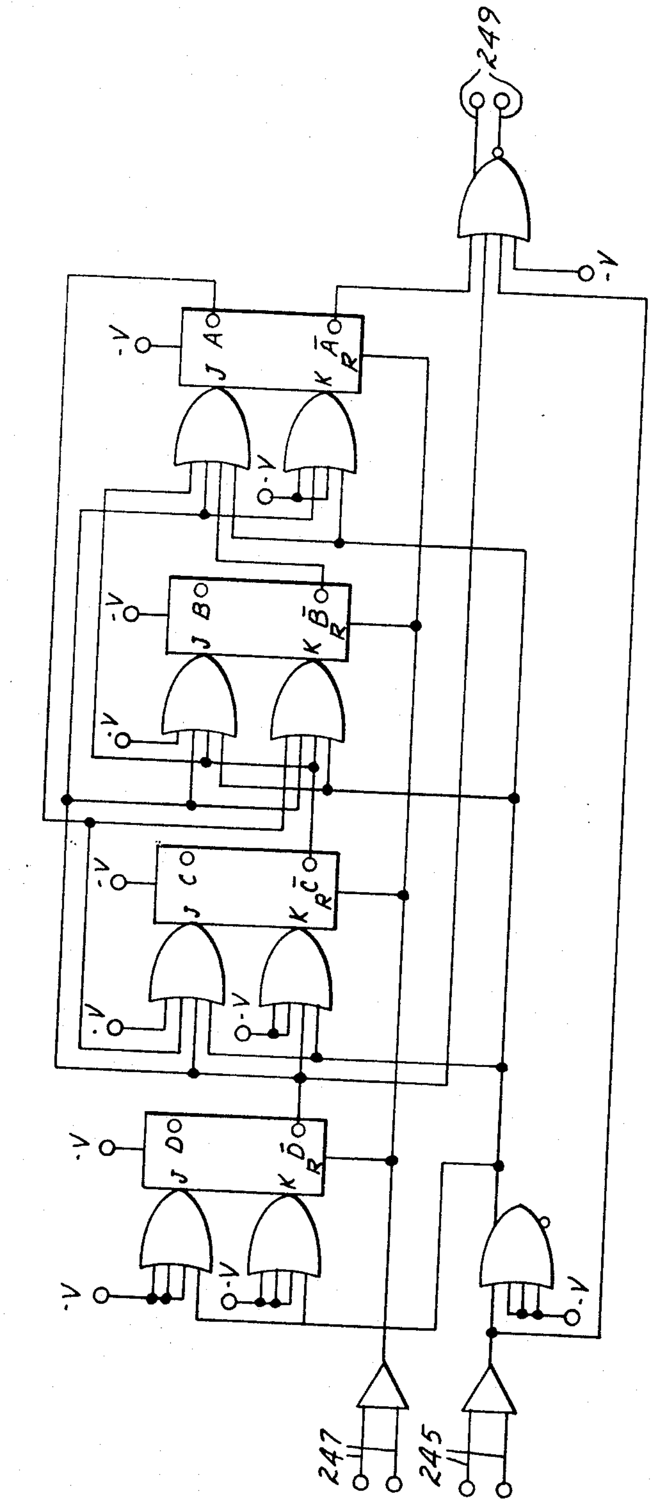

The time-division multiplexed signal is delivered on the output lines 245 from the decoder driver circuit 244 to each of the decade decoders 248, 250 and 252 of the decade decoder circuit 246. In response to each time slot of the time-division multiplex signal, a reset pulse is delivered on the lines 247 to each of the decade decoders 248, 250 and 252. Thus, each succeeding time slot is delivered over a different set of three output channels 254 from the three decade decoders 248, 250 and 252. The decoder driver circuit is shown in detail in FIG. 14. The decade decoders 248, 250 and 252 are of identical construction, except that the hundreds decade decoder 252 does not provide an output for further conveying the time-division multiplexed signal, such as is provided on lines 249 from the units decade decoder 248. The units decade decoder 248 is shown in detail in FIGS. 15A and 15B. The A, $\overline{A}$, B, $\overline{B}$, C, $\overline{C}$, D and $\overline{D}$ outputs of the flip-flops shown in FIG. 15A are connected to the like identified terminals in FIG. 15B. The output channels 254 are balanced line pairs, as shown in FIG. 15B, wherein each channel 254 is identified by its units channel number.

A central office interface circuit 256 is shown in detail in FIGS. 16A and 16B. When the time-division multiplexed signal is simultaneously received on the units input channel 258, the tens input channel 260 and the hundreds input channel 262, it is transferred to line 265; and the demodulator circuit 264 demodulates this signal and provides a composite output signal at a terminal 266.

When the system of the present invention is used to provide telephone services, the pulsed signal (time-division multiplexed signal) received at the interface circuit 256 contains a first type of information such as audio information, derived from a first input base band signal, such as an audio input signal, within a first base frequency band such as 250 Hertz to 4 KHz., and a second type of information such as supervisory information, derived from a second input signal such as a supervisory signal at a second frequency outside the first base frequency band such as 5 KHz. The composite output signal at terminal 266 produced by demodulation of the pulsed signal in the demodulator circuit 264 then contains both the audio information within the frequency range of 250 Hz. to 4 KHz. and the supervisory information at the frequency of 5 KHz.

In accordance with the second aspect of the present invention as noted above under the heading "Field of the Invention", the composite output signal at terminal 266 is treated in a synchronous detector circuit to provide a signal corresponding to the supervisory information, onto telephone lines 268 and 269.

The synchronous detector circuit, which comprises a first circuit 270, a second circuit 272 and a third circuit 274, produces an output signal corresponding to the supervisory information on the lines 268 an 269 whenever the composite signal at the terminal 266 contains second frequency components such as 5 KHz components, in synchronization with the pulsed signal present on the line 265.

The first circuit 270 detects the pulsed signal from the line 265 and generates on the line 271, a first signal at the second frequency of 5 KHz which is in synchronization with the pulsed signal on the line 265.

The second circuit 272 mixes the composite signal from the terminal 266 and the first signal from the line 271 to produce on the line 273 a second signal which will contain a DC component whenever the composite signal at the terminal 266 contains supervisory information at the second frequency of 5 KHz.

The third circuit 274 detects the DC component in the second signal on the line 273 and produces an output signal on the telephone line pair 268 and 269 in response thereto.

Within the third circuit 274, the second signal from the line 273 is filtered in the filter circuit 276 to filter out the AC components of the mixed signal and thereby leave only the DC component. When this DC component appears on input line 277 to relay 278, the relay 278 is triggered to close and thereby place an indication of the detection of the supervisory signal across the telephone line pair 268 and 269.

To provide an audio output signal, the composite output signal at the terminal 266 is transferred via line 280 to an audio filter circuit 282, from which a filtered audio signal is provided on line 284. The filtered audio signal on the line 284 is fed through the telephone coupling circuit 286 and is thereby placed out across the telephone lines 268 and 269 at resistor 288.

Audio information received in on the telephone line pair 268 and 269 is transferred through the telephone coupling circuit 286 and placed on an input channel 12 which is connected to a modulator circuit 64, 66 of the transmitter terminal 10 (FIG. 5).

When a ringing signal is applied at the central office 40 across the telephone lines 268 and 269, the field effect transistor (FET) 292 is turned on. The FET 292 is coupled to the telephone lines 268 and 269 through the lamp-photocell module 293. While the FET 292 is turned on, the 5 KHz square wave supervisory signal from the supervisory signal input line 290 is fed through the FET 292 onto the input channel 12. Light emitting diode (LED) 294 provides a visual indication when the ringing signal is applied across the lines 268 and 269.

LED 296 lights up to provide an indication when a supervisory signal is placed onto the telephone lines 268 and 269 from the relay 278 thereby indicating an off-hook condition.

Figure 17:
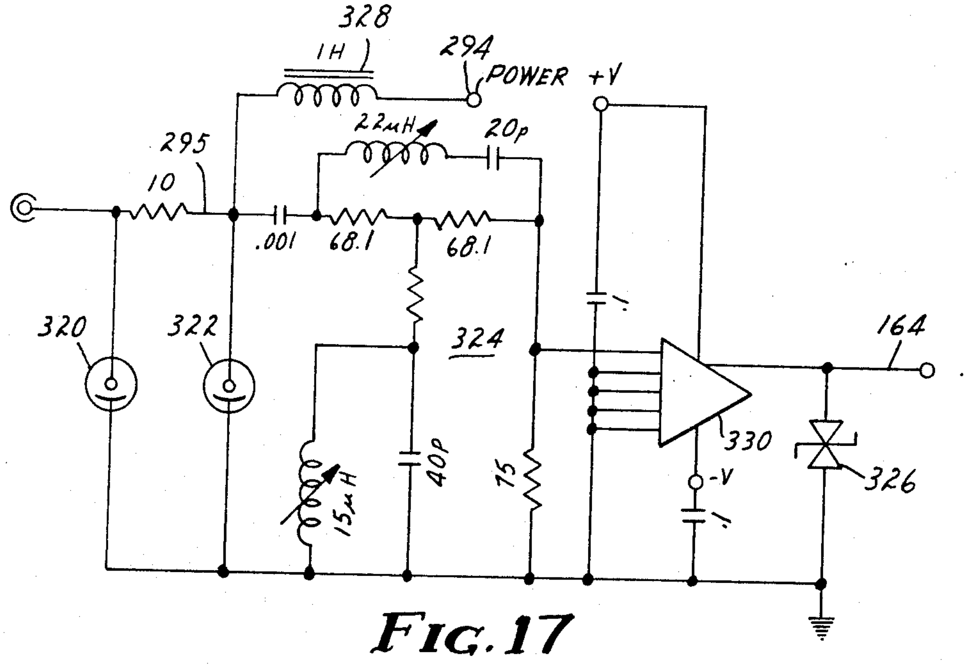
FIG. 17 is a schematic circuit diagram of the cable equalization and protection circuit included in the subscriber terminal shown in FIG. 7 and included in the receiver terminal shown in FIG. 13.

The cable equalization and protection circuit 240 of the receiver terminal 18 and each of the cable equalization and protection circuits 162 of the subscriber terminals 16 are preferably of identical construction. A cable equalization and protection circuit 162 is shown in detail in FIG. 17. The component values shown in FIG. 17 are selected for a circuit 162 which is connected to 6000 foot sections of Superior No. 6030 coaxial cable manufactured by Superior Cable Co. of Hickory, N.C.

Figure 18:
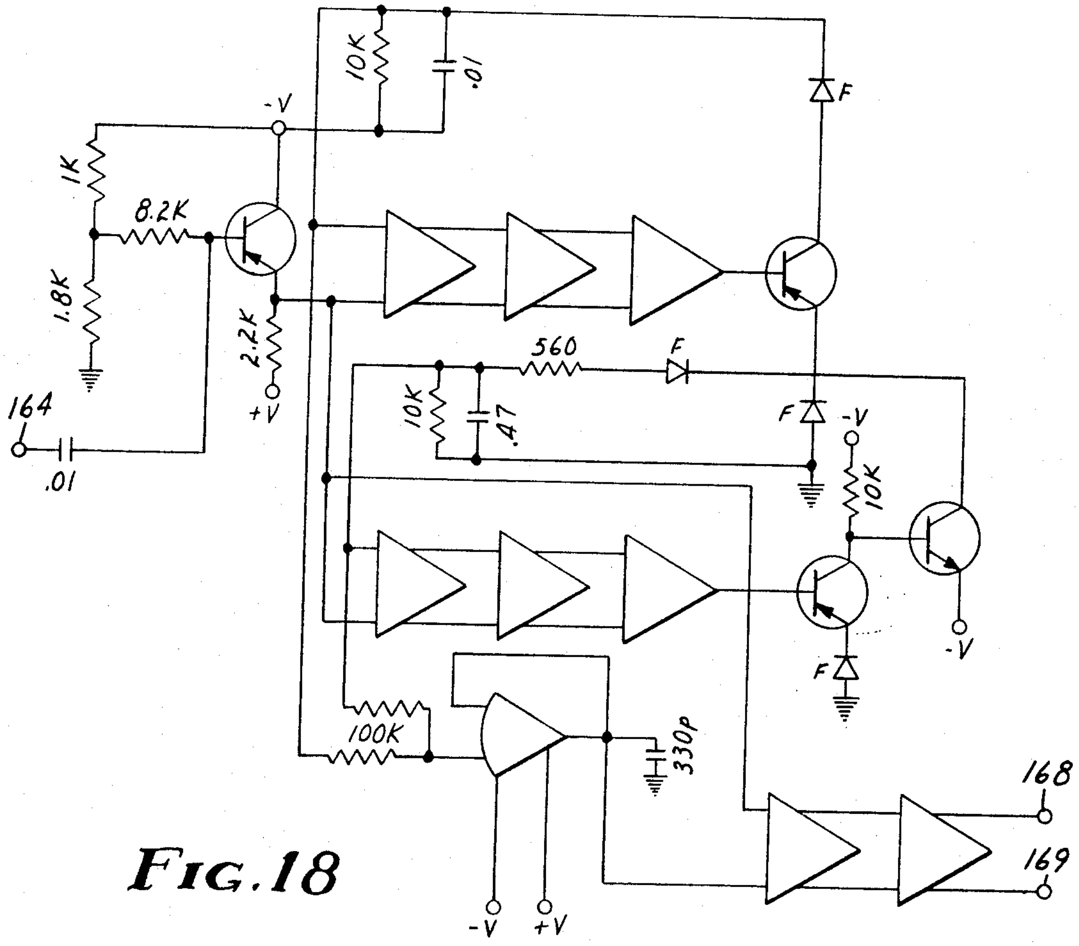
FIG. 18 is a combined logic and schematic circuit diagram of the receiver circuit included in the subscriber terminal shown in FIG. 7 and included in the receiver terminal shown in FIG. 13.

The gas tubes 320 and 322 provide protection for the terminals against sudden voltage surges, such as might be provided by lightning striking near the cable 14. The equalization network 324 equalizes the attenuation inherent in the cable to provide a flat frequency response on the line 164. Final surge protection is provided by the zener diode 326. Terminal 294 is a power terminal. Choke coil 328 isolates the power terminal 294 from the line 295 upon which the time-division multiplexed signal is carried. The receiver circuit 242 of the receiver terminal 18 and each of the receiver circuits 165 of the subscriber terminals 16 are preferably of identical construction. A receiver circuit 165 is shown in detail in FIG. 18.

Each of the line driver circuits 204 of the subscriber terminals 16 and the line driver circuit 60 of the transmitter terminal 10 are preferably of identical construction. A line driver circuit 204 is shown in detail in FIG. 19. Terminal 369 is a power terminal.

Figures 20, 20A:
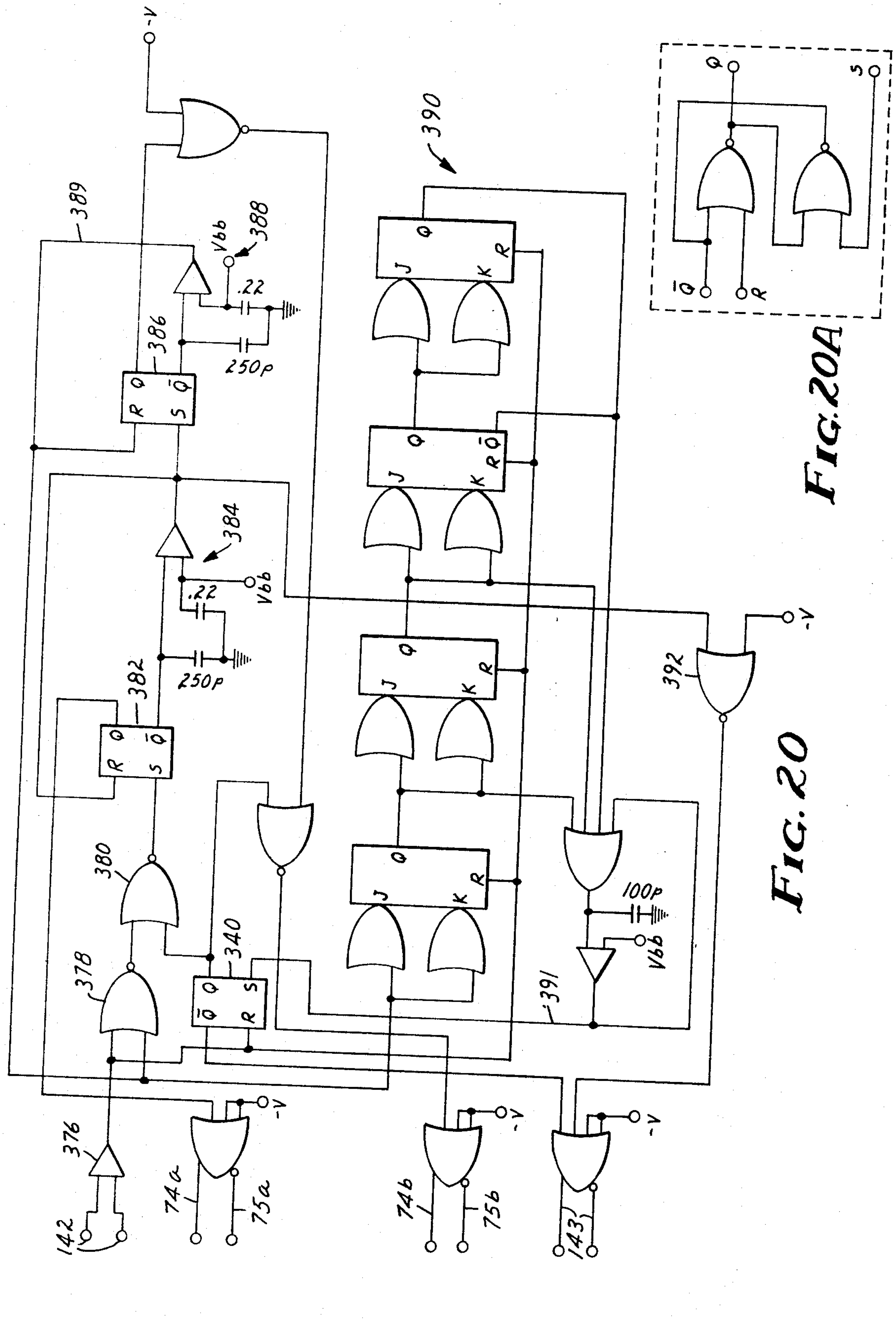
FIG. 20 is a combined logic and schematic circuit diagram of the channel reservation circuit included in the transmitter terminal shown in FIG. 5.
FIG. 20A is a logic circuit diagram of a specially constructed flip-flop used in the channel reservation circuit of FIG. 20.

A channel reservation circuit 72 used in the transmitter terminal 10 is shown in detail in FIG. 20. A logic diagram for flip-flop 340 is shown in FIG. 20A. When a signal is received on the lines 142, thereby indicating that the time slot corresponding to the last channel provided by the next preceding modulator circuit 64, or channel reservation circuit 72 has been delivered to the OR gate 77, (FIG. 5) the line receiver 376 delivers a logic 1 pulse through NOR gates 378 and 380 to the set input of flip-flop 382. A $\bar{Q}$ output signal from the flip-flop 382 is fed through a delay circuit 384 to the set input of the flip-flop 386. The delay provided by the delay circuit 384 is about 75 nano seconds. A Q output signal from the flip-flop 382 is fed onto the output lines 74*a* and 75*a*. The signal from the delay circuit 384 resets flip-flop 382 75 nano seconds thereafter to change the signal on the output lines 74*a* and 75*a*.

A $\bar{Q}$ output signal is fed from the flip-flop 386 through a 75 nano second delay circuit 388 back through the NOR gates 378 and 380 to the set input of the flip-flop 382. A Q output signal from the flip-flop 386 is fed onto the output lines 74*b* and 75*b*. The signal from the delay circuit 388 resets the flip-flop 386 75 nano seconds thereafter to change the signal on the output lines 74*b* and 75*b*.

All output signals from the delay circuit 388 are fed on line 289 to the counting circuit 390. Inasmuch as the preferred channel reservation circuit 72 delivers 25 time slots, the counter circuit 390 provides an output signal on line 391 after counting the delivery of twelve signals from the delay circuit 388. Delay circuit 388 provides a signal for the initiation of only the even numbered time slots. The signal provided on the line 291 after the count reaches twelve is to set the flip-flop 340, which in turn provides a signal from its Q output to inhibit the OR gate 380 from passing any further signals to the set input of the flip-flop 382. Thus, the succession of time slots furnished to the respective output lines 74*a*, 75*a* and 74*b*, 75*b* is terminated with twenty times slots being furnished to each.

When the channel reservation circuit 72 correspnds to an odd numbered group of modulator channels such as 401–425, 451–475, etc., the output lines 74*a* and 75*a* are connected to the line receiver 76 shown in FIG. 5. When the channel reservation circuit 72 corresponds to an even numbered group of modulator channels such as 376–400, 426–450, etc., the output lines 74*b* and 75*b* are connected to the line receiver 76. The channel reservation circuits 72 are so connected to the line receivers 76 in such an alternative manner in order that the last time slot provided from a given channel reservation circuit 72 may be distinguished from the first time slot of the next sequentially connected channel reservation circuit 72 or modulator circuit 66.

Upon the flip-flop 340 being set, the $\bar{Q}$ signal from the flip-flop 340 is terminated, thereby enabling the thirteenth and last signal provided from the delay circuit 384 to be delivered through NOR gate 392 and onto the lines 143 as a last pulse indicating signal. This last pulse indicating signal is delivered either to the next channel reservation board 72, a modulator channel circuit 64, or the last modulator channel circuit 66 of the transmitter terminal 10. This last pulse indicating signal indicates that the last of the 25 pulses from the channel reservation circuit 72 is being delivered to an input of the OR gate 77.

Figure 19:
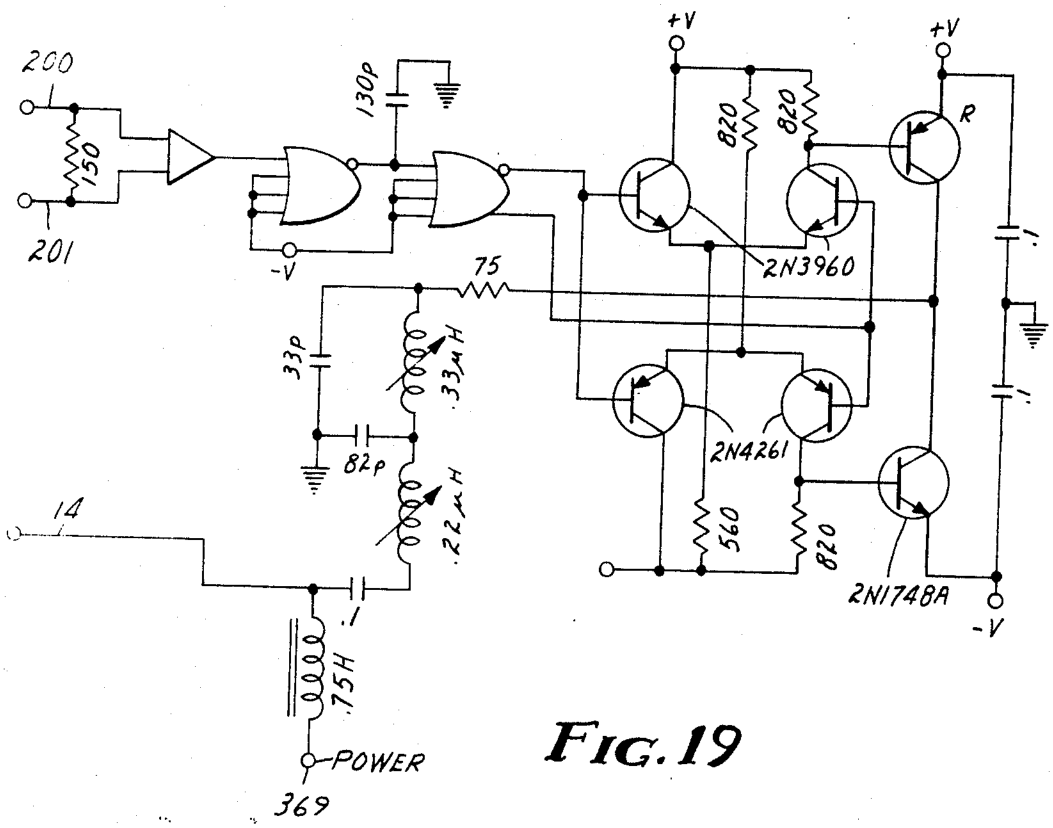
FIG. 19 is a combined logic and schematic circuit diagram of the line driver circuit included in the transmitter terminal shown in FIG. 5 and included in the subscriber terminal shown in FIG. 7.
Figure 21:
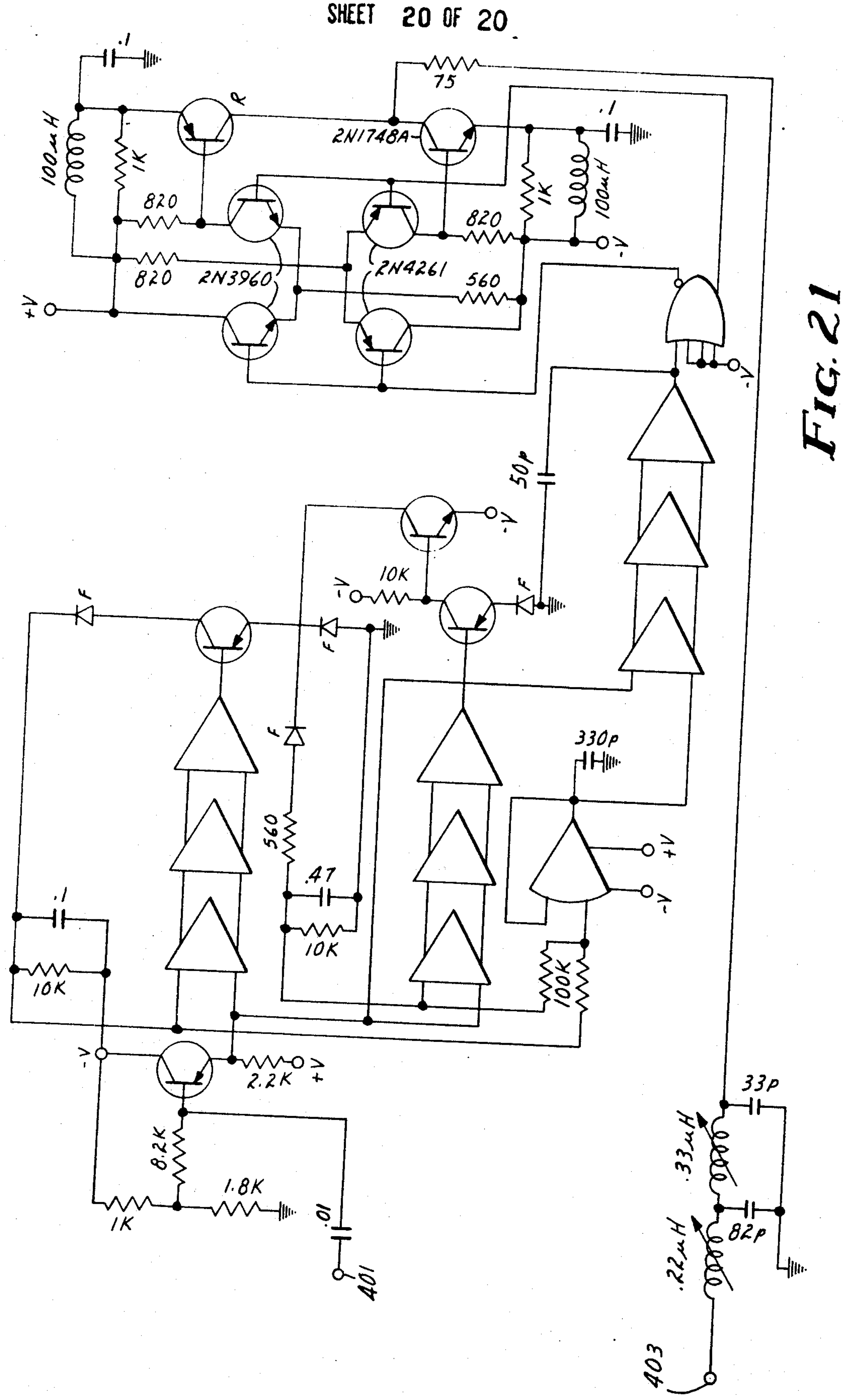
FIG. 21 is a combined block and schematic circuit diagram of a regenerator included in FIGS. 1–3.

A diagram for a pulse regenerator 26 is shown in FIG. 21. A time-division multiplexed signal received from the wideband circuit 14 is fed through a cable equalization and protection circuit such as is shown in FIG. 17, to an input terminal 401. The regenerated signal is provided from terminals 403 through a line driver, such as is shown in FIG. 19, onto a coaxial cable 14.

What is claimed is:

1. A time sharing subscriber communications system wherein a time-division multiplexed signal, having a series of frames and a predetermined number of time slots in each frame, is carried from a transmitter terminal over a single communications circuit containing a plurality of series connected subscriber terminals; wherein the transmitter terminal includes means for placing information corresponding to input signal received from various input channels in the time slots in the series order of the subscriber terminals; and wherein each of the subscriber terminals includes means for tapping-off from each frame the information contained in a set of one or more time slots related to that subscriber terminal and for retransmitting the other information over the circuit along with new information provided at the subscriber terminal, characterized by the feature that each subscriber terminal has circuit means which comprise:

first ciruit means for inhibiting retransmission of the first set of one or more time slots in each frame which is received at that subscriber terminal, second circuit means for enabling retransmission of the remaining portion of the time slots of the received signal, and third circuit means for enabling subsequent transmission of the new information provided at the subscriber terminal as the last set of time slots in each frame, whereby the information for the succeeding subscriber terminal occupies the first set of time slots in each frame of the retransmitted signal.

2. A time sharing subscriber communications system according to claim 1 characterized by the feature that the circuit means comprise an input channel for providing the received time-division multiplexed signal;

a first counter circuit for counting the time slots in each frame of the received signal and for providing an indication when all of said time slots in the frame have been received;

a modulator circuit connected to a source of new information provided at the subscriber terminal and to the first counter circuit for providing the new information as the last set of time slots in response to the indication from the first counter circuit that all of the time slots in the frame have been received;

a second counter circuit for counting the time slots in each frame of the received signal and for providing an indication upon the receipt of the last time slot in the first set of one or more time slots in each frame;

a sync pulse flip-flop connected to the modulator circuit to be set to provide a sync pulse signal in response to the indication from the modulator circuit that the last set of time slots has been provided, and connected to the second counter circuit to be reset to terminate the sync pulse in response to the indication from the second counter which is provided upon the receipt of the last time slot of the first set of time slots; and a transmitter gate connected to the input channel, to the modulator circuit, and to the sync pulse flip-flop for inhibiting transmission from the input channel and the modulator circuit during the duration of the sync pulse from the sync pulse flip-flop, and for thereby providing from the subscriber terminal, an output signal consisting of the sync pulse immediately followed by the remaining portion of the received signal and subsequently followed by the last set of time slots containing the new information provided at the subscriber terminal.

3. A time sharing subscriber communications system according to claim 2, characterized by the feature that whenever the number of time slots in the first set of time slots is an odd number, the received time-division multilex signal is provided in inverted form on the input channel connected to the transmitter gate.

4. A communication system wherein a composite signal is transmitted from one terminal to another as part of a modulated transmitted signal, said composite signal comprising a base band signal which represents one type of information, and a second signal having a frequency outside of said base band and representing a second type of information, wherein the improvement comprises:

a demodulating means at one of said terminals for recovering said composite signal from said modulated transmitted signal; and a sychronous detector circuit for providing a signal correspnding to the second type of information, and including:

first circuit means responsive to said modulated transmitted signal for producing a signal in synchronism with said second signal;

second circuit means for mixing the outputs of said demodulating means and said first circuit means; and third circuit means for recovering said second type of information from the output of said second circuit means.

5. A communications system according to claim 4 wherein said third circuit means recovers said second type of information by detecting a D.C. component in the output signal from the second means and producing an output signal in response thereto.

* * * * *

UNITED STATES PATENT OFFICE

CERTIFICATE OF CORRECTION

Patent No. 3,751,595 Dated August 7, 1973

Inventor(s) Donald W. Moses

It is certified that error appears in the above-identified patent and that said Letters Patent are hereby corrected as shown below:

Column 1, line 28, change "timedivision" to --time-division--.

Column 18, line 11, change "291" to --391--.

Column 20, line 14, change "multilex" to --multiplex--.

Signed and sealed this 15th day of January 1974.

(SEAL)
Attest:

EDWARD M. FLETCHER, JR.
Attesting Officer

RENE D. TEGTMEYER
Acting Commissioner of Patents